US012749975B2

(12) United States Patent
Szczeszynski

(10) Patent No.: US 12,749,975 B2
(45) Date of Patent: Sep. 29, 2026

(54) LIGHT-LOAD RECOVERY IN A MULTI-LEVEL CONVERTER

(71) Applicant: Murata Manufacturing Co., Ltd., Kyoto (JP)

(72) Inventor: Gregory Szczeszynski, Nashua, NH (US)

(73) Assignee: Murata Manufacturing Co., Ltd., Kyoto (JP)

( * ) Notice: Subject to any disclaimer, the term of this patent is extended or adjusted under 35 U.S.C. 154(b) by 133 days.

(21) Appl. No.: 18/650,411

(22) Filed: Apr. 30, 2024

(65) Prior Publication Data

US 2024/0356442 A1 Oct. 24, 2024

Related U.S. Application Data

(63) Continuation of application No. PCT/US2022/078920, filed on Oct. 28, 2022, which is a continuation of application No. 17/560,683, filed on Dec. 23, 2021, now Pat. No. 12,155,301.

(60) Provisional application No. 63/276,962, filed on Nov. 8, 2021.

(51) Int. Cl.

*H02M 3/158* (2006.01)
*H02M 1/00* (2006.01)
*H02M 1/14* (2006.01)

(52) U.S. Cl.

CPC ......... *H02M 3/158* (2013.01); *H02M 1/0095* (2021.05); *H02M 1/14* (2013.01)

(58) Field of Classification Search

CPC ....... H02M 3/158; H02M 1/0095; H02M 1/14
See application file for complete search history.

(56) References Cited

U.S. PATENT DOCUMENTS

| | | | |
|---|---|---|---|
| 4,257,087 | A | 3/1981 | Cuk |
| 4,654,769 | A | 3/1987 | Middlebrook |
| 4,720,668 | A | 1/1988 | Lee |
| 5,969,484 | A | 10/1999 | Santi |

(Continued)

FOREIGN PATENT DOCUMENTS

| | | | |
|---|---|---|---|
| CN | 110545040 A | | 12/2019 |
| CN | 111697821 A | | 9/2020 |
| WO | WO20230816 10 | A1 | 5/2023 |

OTHER PUBLICATIONS

Jia Guanlong et al "Active Power Decoupling for a Modified Modular Multilevel Converter to Decrease Submodule Capacitor Voltage Ripples and Power Losses" IEEE Transactions on Power Electronics Institute of Electrical and Electronics Engineers USA vol. 36 No. 3 doi: 10.1109TPEL.2020.3016493 I.

(Continued)

*Primary Examiner* — Rafael O De Leon Domenech
(74) *Attorney, Agent, or Firm* — Haynes and Boone, LLP

(57) ABSTRACT

Circuits and methods that solve the light-load problem of a multi-level converter by generating a ripple signal in the control loop of the multi-level converter that causes a large output current ripple during light load conditions. This added current ripple does not change the average output current but does create a temporary positive and negative current that can be used to balance and charge/discharge the fly capacitors of the multi-level converter. An alternative approach is to add extra switching cycles for the fly capacitors when the output ripple current crosses zero.

20 Claims, 11 Drawing Sheets

(56) References Cited

U.S. PATENT DOCUMENTS

| | | | |
|---|---|---|---|
| 6,294,900 | B1 | 9/2001 | Greenwood |
| 6,304,460 | B1 | 10/2001 | Cuk |
| 8,159,200 | B2 | 4/2012 | Lesso |
| 9,160,232 | B2 | 10/2015 | Thomas |
| 9,337,732 | B2 | 5/2016 | Kondou |
| 9,571,006 | B2 | 2/2017 | Stahl |
| 9,641,071 | B2 | 5/2017 | Logiudice |
| 9,748,841 | B2 | 8/2017 | Granato |
| 9,899,918 | B2 | 2/2018 | Lee |
| 10,090,763 | B1 | 10/2018 | Mercer |
| 10,547,241 | B1 | 1/2020 | Li |
| 10,686,367 | B1 | 6/2020 | Low |
| 10,720,842 | B1 | 7/2020 | Wu |
| 10,720,843 | B1 | 7/2020 | Wu |
| 10,770,974 | B2 | 9/2020 | Wu |
| 10,992,226 | B1 | 4/2021 | Aboueldahab |
| 11,581,796 | B2 * | 2/2023 | Yan .................... H02M 1/0025 |
| 11,646,665 | B2 | 5/2023 | Wu |
| 2006/0087295 | A1 | 4/2006 | Jang |
| 2009/0001955 | A1 | 1/2009 | Yoshida |
| 2009/0059630 | A1 | 3/2009 | Williams |
| 2009/0189393 | A1 | 7/2009 | Tyagi |
| 2010/0052050 | A1 | 3/2010 | Lotfi |
| 2010/0259240 | A1 | 10/2010 | Cuk |
| 2011/0057640 | A1 | 3/2011 | Cuk |
| 2012/0194164 | A1 | 8/2012 | Logiudice |
| 2012/0262967 | A1 | 10/2012 | Cuk |
| 2012/0268969 | A1 | 10/2012 | Cuk |
| 2013/0088211 | A1 | 4/2013 | Radtke |
| 2014/0232364 | A1 | 8/2014 | Thomas |
| 2015/0003127 | A1 | 1/2015 | Takizawa |
| 2015/0230302 | A1 | 8/2015 | Ito |
| 2016/0118817 | A1 | 4/2016 | Uno |
| 2016/0197552 | A1 | 7/2016 | Giuliano |
| 2018/0026518 | A1 | 1/2018 | Liu |
| 2018/0062507 | A1 | 3/2018 | Giuliano |
| 2018/0123341 | A1 | 5/2018 | Lehn |
| 2018/0131281 | A1 | 5/2018 | Inoue |
| 2018/0166994 | A1 | 6/2018 | Dorn |
| 2019/0109530 | A1 | 4/2019 | Perreault |
| 2019/0115830 | A1 | 4/2019 | Giuliano |
| 2019/0199221 | A1 | 6/2019 | Zhao |
| 2019/0319526 | A1 | 10/2019 | Yang |
| 2020/0228016 | A1 | 7/2020 | Wu |
| 2020/0243744 | A1 | 7/2020 | Chaput |
| 2021/0367430 | A1 | 11/2021 | Da Silva |
| 2022/0190712 | A1 | 6/2022 | Chen |
| 2022/0190738 | A1 | 6/2022 | Chen |
| 2022/0224231 | A1 | 7/2022 | Rizzolatti |
| 2022/0321010 | A1 | 10/2022 | Bieber |
| 2022/0416653 | A1 | 12/2022 | Giuliano |
| 2022/0416664 | A1 | 12/2022 | Wu |
| 2023/0136027 | A1 | 5/2023 | Szczeszynski |
| 2023/0148059 | A1 | 5/2023 | Szczeszynski |
| 2023/0344352 | A1 | 10/2023 | Wu |
| 2023/0387796 | A1 | 11/2023 | Wu |

OTHER PUBLICATIONS

Xiaoming Yuan et al "Self-Balancing of the Clamping-Capacitor-Voltages in the Multilevel Capacitor-Clamping-Inverter under Sub-Harmonic PWM Modulation" IEEE Transactions on Power Electronics Institute of Electrical and Electronics Engineers USA (Mar. 1, 2001) vol. 16 No. 2 ISSN 0885-8993.

Meynard et al., "Multi-Level Conversion: High Voltage Choppers and Voltage-Source inverters", Jun. 1992, vol. 1, pp. 397-406, Proceedings of the Annual Power Electronics Specialists Conference, IEEE, US.

Peng, Fang Zheng, "A Generalized Multilevel Inverter Topology with Self Voltage Balancing", Mar. 2001, vol. 37, No. 2, pp. 611-618, IEEE Transactions on Industry Applications, IEEE Service Center.

Chen et al., "Zero-Voltage-Switching PWM Hybrid Full-Bridge Three-Level Converter", Mar. 2005, vol. 20, No. 2, pp. 395-404, IEEE Transactions on Power Electronics, Institute of Electrical and Electronics Engineers.

Lin et al., "Interleaved Resonant Converter with the Balanced Flying Capacitors", Mar. 2015, vol. 8, No. 3, pp. 447-457, IET Power Electronics, IET, UK.

Carl Nelson, Analog Circuit Design. Stub from Chapter 5—LT1070 design manual. Editor(s): Bob Dobkin, Jum Williams. ISBN 9780123851857 (Year: 2011).

Da Rocha, et al., "Level Shifters and DCVSL for a Low-Voltage CMOS 4.2-V Buck Converter", Sep. 2008, vol. 55, No. 9, pp. 3315-3323, IEEE Transactions on Industrial Electronics.

Sepahvand, et al., "Start-Up Procedure and Switching Loss Reduction for a Single-Phase Flying Capacitor Active Rectified", Sep. 2013, vol. 60, No. 9, pp. 3699-3710, IEEE Transactions on Industrial Electronics.

Zou, et al., "The Analysis of DC-DC Converter Topologies Based on Stackable Voltage Elements", Sep. 2010, pp. 4428-4433, IEEE.

* cited by examiner

LIGHT-LOAD RECOVERY IN A MULTI-LEVEL CONVERTER

CROSS-REFERENCE TO RELATED APPLICATIONS—CLAIM OF PRIORITY

The present application is a continuation of PCT Patent Application No. PCT/US2022/078920, filed on Oct. 28, 2022 and titled "Improving Light-Load Recovery in a Multi-Level Converter" which is herein incorporated by reference in its entirety and which, in turn, is a continuation of U.S. patent application Ser. No. 17/560,683, filed on Dec. 23, 2021, for a "Light-Load Recovery in a Multi-Level Converter," which claims priority to U.S. Provisional Application No. 63/276,962, filed on Nov. 8, 2021, for a "Light-Load Recovery in a Multi-Level Converter," both of which are herein incorporated by reference in their entirety.

BACKGROUND

(1) Technical Field

This invention relates to electronic circuits, and more particularly to power converter circuits, including DC-DC power converter circuits.

(2) Background

Many electronic products, particularly mobile computing and/or communication products and components (e.g., cell phones, notebook computers, ultra-book computers, tablet devices, LCD and LED displays) require multiple voltage levels. For example, radio frequency (RF) transmitter power amplifiers may require relatively high voltages (e.g., 12V or more), whereas logic circuitry may require a low voltage level (e.g., 1-3V). Still other circuitry may require an intermediate voltage level (e.g., 5-10V).

Direct current power converters are often used to generate a lower or higher voltage from a common power source, such as batteries, solar cells, fuel cells, and rectified AC sources. Power converters which generate a lower output voltage level from a higher input voltage power source are commonly known as buck converters, so-called because the output voltage $V_{OUT}$ is less than the input voltage $V_{IN}$, and hence the converter is "bucking" the input voltage. Power converters which generate a higher output voltage level from a lower input voltage power source are commonly known as boost converters, because $V_{OUT}$ is greater than $V_{IN}$. Some power converters may be either a buck converter or a boost converter depending on which terminals are used for input and output. Some power converters may provide an inverted output. Some power converters known as multi-level converters use charge transfer capacitors that are commonly referred to as "fly capacitors" or "pump capacitors".

One of the drawbacks of multi-level converters is that the fly capacitors $C_{Fx}$ can only change voltage by using the output load current to move energy in or out of them. When the load is light (zero or very low, such as less than about 10% of the absolute value of the maximum current specification for a typical converter), the fly capacitors $C_{Fx}$ cannot rebalance or re-adjust their voltages, even if provided with charge balancing circuitry. Balancing charge on the fly capacitors $C_{Fx}$ is necessary in order to maintain their average voltage and avoid stress on the switches. This characteristic is particularly a problem when there is a line-step at the input $V_{IN}$ of a multi-level converter, such as may occur when switching power supplies (e.g., from one battery to another, or from a battery to a rectified AC main line source). If $V_{IN}$ suddenly changes, the fly capacitors $C_{Fx}$ cannot re-adjust their respective voltages until a load current is present for a sufficiently long period of time.

Accordingly, there is a need for circuits and methods for improving light load recovery in a multi-level converter. The present invention addresses this need.

SUMMARY

The present invention encompasses circuits and methods that solve the light-load problem of a multi-level converter by generating a ripple signal in the control loop of the multi-level converter that causes a large output current ripple during light load conditions. This added current ripple does not change the average output current but does create a temporary positive and negative current that can be used to balance and charge/discharge the fly capacitors of the multi-level converter. An alternative approach is to add extra switching cycles for the fly capacitors when the output ripple current nears or crosses zero.

Circuit embodiments include a multi-level converter including: an M-level converter cell configured to transform an input voltage applied to an input terminal to an output voltage on an output terminal in response to switch control inputs; a controller coupled to M-level converter cell, the controller configured to monitor the output voltage of the M-level converter cell and dynamically generate the switch control inputs to the M-level converter cell; and a sub-harmonic signal generator coupled to the controller and configured to selectively inject a sub-harmonic signal into a signal path of the controller so as to induce a sub-harmonic ripple at the output terminal of the M-level converter cell.

Methods include improving light load recovery in an M-level multi-level converter configured to transform an input voltage applied to an input terminal to an output voltage on an out-put terminal in response to input signals from a controller defining charging cycles and discharging cycles for the multi-level converter. A first method injects a sub-harmonic signal into a signal path of the controller so as to induce a sub-harmonic ripple at the output terminal of the M-level multi-level converter. A second method adds an extra charging cycle at a zero-current crossing point after a discharging cycle, and adds an extra discharging cycle at a zero-current crossing point after a charging cycle The details of one or more embodiments of the invention are set forth in the accompanying drawings and the description below. Other features, objects, and advantages of the invention should be apparent from the description and drawings, and from the claims.

DESCRIPTION OF THE DRAWINGS

Like reference numbers and designations in the various drawings indicate like elements.

DETAILED DESCRIPTION

Figure 1:
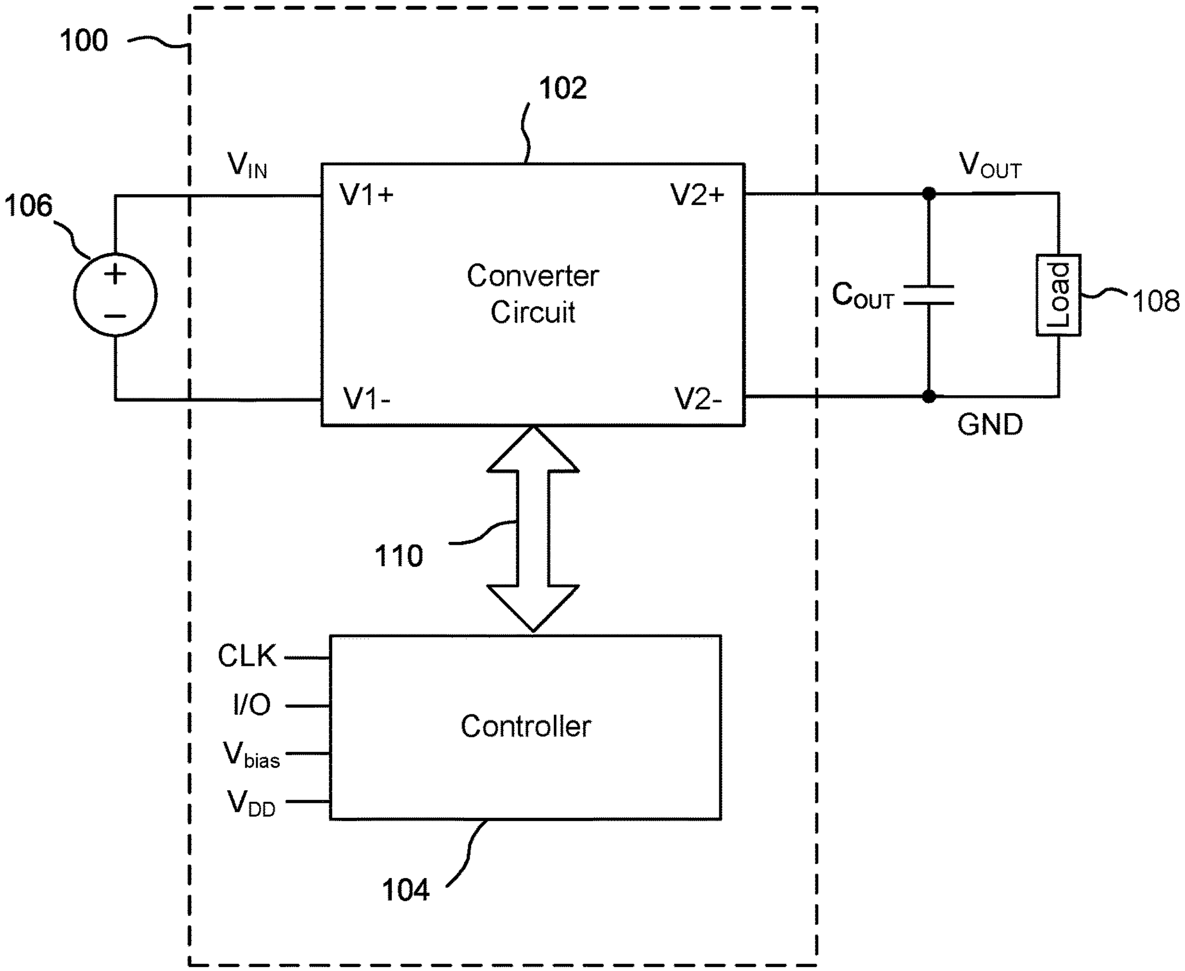
FIG. 1 (Prior Art)
FIG. 1 is a block diagram of a circuit that includes a prior art power converter.

FIG. 1 is a block diagram of a circuit that includes a prior art power converter 100. In the illustrated example, the power converter 100 includes a converter cell 102 and a controller 104. The converter cell 102 is configured to receive an input voltage $V_{IN}$ from a voltage source 106 (e.g., a battery) across terminals V1+, V1−(common), and transform the input voltage $V_{IN}$ into an output voltage $V_{OUT}$ across terminals V2+, V2−(common). The output voltage $V_{OUT}$ is generally coupled across an output capacitor $C_{OUT}$, across which may be connected a load represented as an equivalent resistance R. In some embodiments of the power converter 100, auxiliary circuitry (not shown), such as a bias voltage generator(s), a clock generator, a voltage control circuit, etc., may also be present and coupled to the converter cell 102 and the controller 104.

The controller 104 receives a set of input signals and produces a set of output signals. Some of these input signals arrive along a signal path 110 connected to the converter cell 102. Some input signals carry information indicative of the operational state of the converter cell 102. The controller 104 generally also receives at least a clock/timing signal CLK (although some controllers may be configured for asynchronous operation, e.g., a hysteretic controller or a constant on time controller) and one or more external input/output signals I/O that may be analog, digital (encoded or direct signal lines), or a combination of both. Based upon the received input signals, the controller 104 produces a set of control signals back to the converter cell 102 on the signal path 110 that control the internal components of the converter cell 102 (e.g., internal switches, such as FETs, especially MOSFETs) to cause the converter cell 102 to convert $V_{IN}$ to $V_{OUT}$. In some embodiments, an auxiliary circuit (not shown) may provide various signals to the controller 104 (and optionally directly to the converter cell 102), such as the clock signal CLK, the input/output signals I/O, as well as various voltages, such as a general supply voltage $V_{DD}$ and a transistor bias voltage $V_{BIAS}$.

Figure 2A:
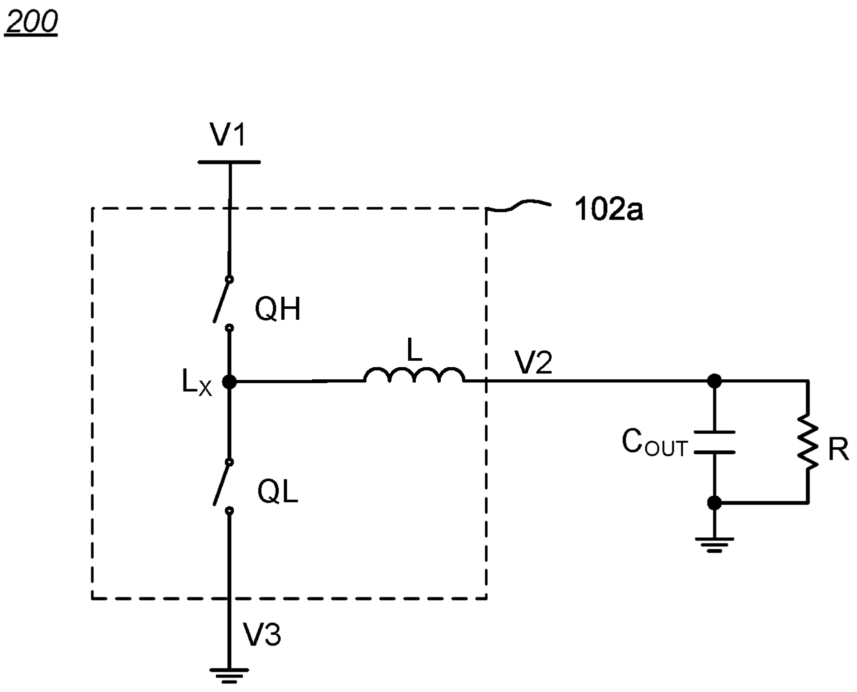
FIG. 2A (Prior Art)
FIG. 2A is a schematic diagram of part of a prior art 2-level DC-to-DC buck converter circuit that includes a particular converter cell.

In some power converter designs, the converter cell 102 uses an inductor as an energy storage element. For example, FIG. 2A is a schematic diagram of part of a prior art 2-level DC-to-DC buck converter circuit 200 that includes a particular converter cell 102*a*. Within the converter cell 102*a*, a set of two switches QH, QL is series-coupled between $V_{IN}$ (applied at terminal V1+) and a common reference voltage (e.g., circuit ground GND, coupled to terminal V1−). An energy storage inductor L is coupled from a node $L_X$ between the set of switches QH, QL to an output capacitor $C_{OUT}$ which provides smoothing and energy storage. The voltage across the output capacitor $C_{OUT}$ from terminal V2+ is $V_{OUT}$ and is coupled to a load R.

One function of the inductor L and the output capacitor $C_{OUT}$ is energy transfer and storage. Part of the controller circuitry for the converter cell 102*a* generally includes a pulse-width modulation (PWM) duty cycle controller (not shown) coupled to control inputs of the switches QH, QL (e.g., the gates of MOSFETs) to alternately enable (close or turn "ON") and disable (open or turn "OFF") the switches QH, QL to control energy flow to the load R. The PWM duty cycle controller generally receives a clock signal and $V_{OUT}$ as a feedback voltage. The feedback voltage enables the PWM duty cycle controller to vary the duty cycle of a PWM control signal to the switches QH, QL to offset changes in the load R, thereby regulating $V_{OUT}$. The PWM duty cycle controller may be part of the controller 104 of FIG. 1 but also may be a stand-alone circuit.

Figure 2B:
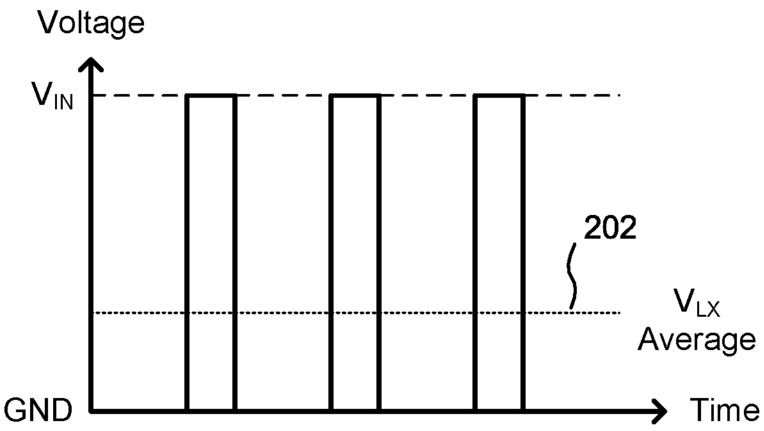
FIG. 2B (Prior Art)
FIG. 2B is a graph showing the voltage level at node $L_X$ as a function of time for the circuit of FIG. 2A.

In the example shown in FIG. 2A, the converter cell 102*a* switches between only two states: QH closed and QL open (voltage level at node $L_X = V_{IN}$), or QH open and QL closed (voltage level at node $L_X$=GND). FIG. 2B is a graph showing the voltage level at node $L_X$ as a function of time for the circuit of FIG. 2A. Graph line 202 is the average voltage level at node $L_X$ as switches QH and QL toggle between the only two available switch states (i.e., QH closed and QL open, or QH open and QL closed). The PWM duty cycle controller sets the time in each switch state, which determines the amplitude of the average voltage at node $L_X$. Power converters 100 based on such converter cells 102*a* are also known as switched-mode power supplies (SMPS) or DC-DC converters.

As can be appreciated by considering FIG. 2B, the inductor L sees large jumps in the voltage level at node $L_X$, from GND to $V_{IN}$ and back to GND. The resulting voltage ripple across the inductor L necessitates a significant amount of filtering to smooth $V_{OUT}$, generally meaning that the inductor L is large—the higher the voltage across the inductor L, the larger the inductance required. In addition, the switches QH and QL may need to withstand the full voltage range from $V_{IN}$ to GND, generally meaning that the switches QH, QL are physically large when implemented as FETs.

The voltage ripple across the inductor L and the voltage swing across any one switch can be reduced by adding more series switches and charge transfer capacitors as energy storage elements to transfer charge from $V_{IN}$ to $V_{OUT}$. Charge transfer capacitors are commonly known as "fly capacitors" or "pump capacitors" and may be internal components of an integrated circuit embodiment of a converter circuit or external components coupled to an integrated circuit embodiment of the remaining converter circuitry.

Figure 3A:
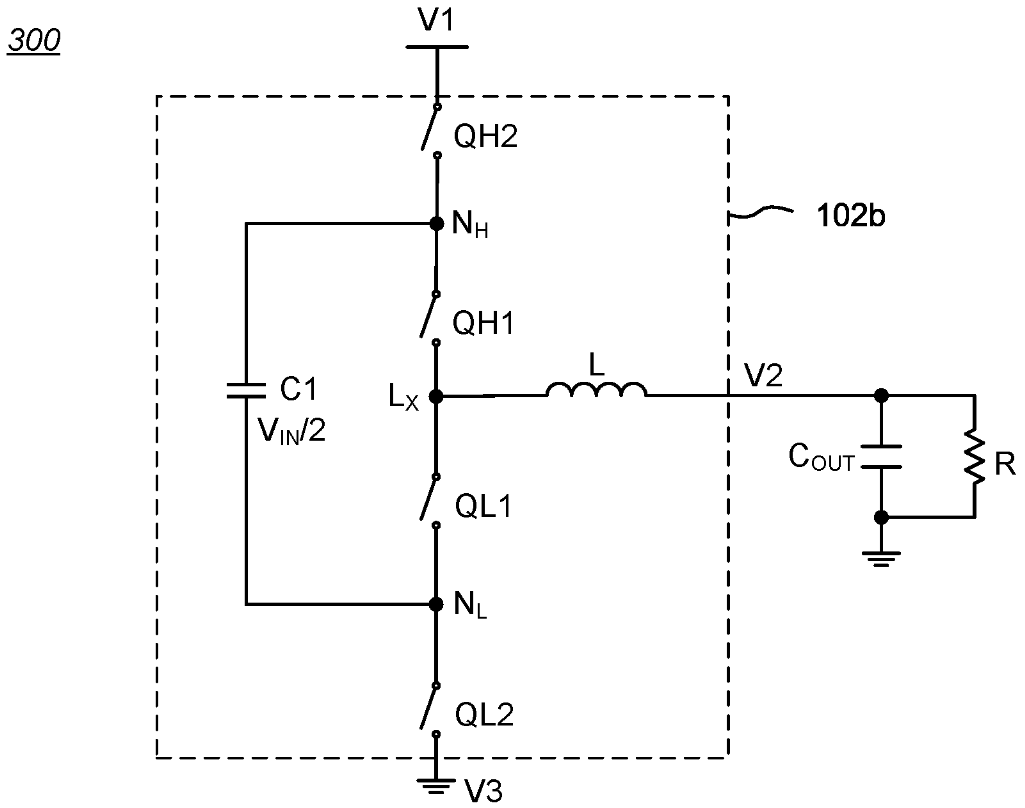
FIG. 3A (Prior Art)
FIG. 3A is a schematic diagram of a part of a prior art 3-level DC-to-DC buck converter circuit that includes a particular converter cell.

For example, FIG. 3A is a schematic diagram of a part of a prior art 3-level DC-to-DC buck converter circuit 300 that includes a particular converter cell 102*b*. A set of four switches, QH2, QH1, QL1, QL2 is series-coupled between $V_{IN}$ (applied at terminal V1+) and a common reference voltage (e.g., circuit ground GND, coupled to terminal V1–). A fly capacitor C1 is coupled from a "high-side" node NH between switches QH2 and QH1 to a "low-side" node $N_L$ between switches QL1 and QL2. An energy storage inductor L is coupled from a node $L_X$ between the innermost set of switches QH1, QL1 to an output capacitor $C_{OUT}$. Again, the voltage across the output capacitor $C_{OUT}$ is $V_{OUT}$. In some embodiments, the inductor L may be external to an integrated circuit embodiment of the converter circuit 300, and in such a case, the node $L_X$ may be considered to be the output terminal of the converter circuit 300.

In the illustrated example, the presence of the fly capacitor C1 in the converter circuit 300 enables four switch states that each generate one of three "node" voltage levels at node $L_X$, as set forth in TABLE 1 below.

TABLE 1

| Voltage Level | QH2 state | QH1 state | QL1 state | QL2 state | $L_X$ voltage |
|---|---|---|---|---|---|
| 1 | Open | Open | Closed | Closed | 0 V |
| 2a | Closed | Open | Closed | Open | $V_{IN}/2$ |
| 2b | Open | Closed | Open | Closed | $V_{IN}/2$ |
| 3 | Closed | Closed | Open | Open | $V_{IN}$ |

Figure 3B:
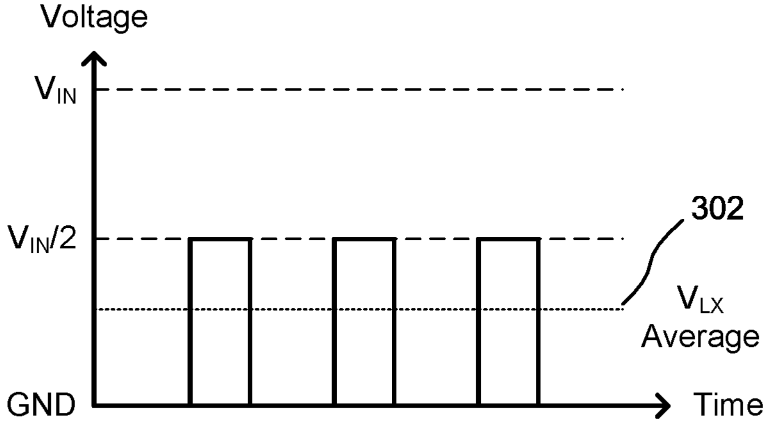
FIG. 3B (Prior Art)
FIG. 3B is a graph showing the voltage level at node $L_X$ as a function of time for the circuit of FIG. 3A.

FIG. 3B is a graph showing the voltage level at node $L_X$ as a function of time for the circuit of FIG. 3A. Graph line 302 is the average voltage level at node $L_X$ as the switches cycle between GND and the two level-2 (i.e., $V_{IN}/2$) switch states and has the same value as graph line 202 in FIG. 2B. As can be appreciated by considering FIG. 3B, the inductor L sees much smaller jumps in the voltage level at node $L_X$, going from GND (Level-1) to only $V_{IN}/2$ (Level-2) and back to GND. The resulting reduced voltage ripple across the inductor L necessitates much less filtering to smooth $V_{OUT}$ and allows use of smaller switches when implemented as FETs.

The topology of the converter cell 102*a* in FIG. 2A is commonly known as a buck converter. The topology of the converter cell 102*b* in FIG. 3A is commonly known as a "multi-level buck converter"-more specifically, a 3-level buck converter—and the topology has been extended to at least 5 levels by adding additional pairs of series switches and corresponding fly capacitors C2 . . . Cn (generically, "$C_{Fx}$").

As is the case with voltage levels 2a and 2b in TABLE 1 for the converter circuit 300, some levels have multiple ways to generate a selected voltage level at node $L_X$. This allows charging or discharging of the fly capacitors $C_{Fx}$ based on the particular state selected. Every fly capacitor $C_{Fx}$ has a target average voltage in order to maintain proper output level. For an M-level converter, where M≥3 and x=1, 2, . . . [M–2], the target voltage for a fly capacitor $C_{Fx}$ is:

$$Vtarget[C_{Fx}] = V_{IN} \times \frac{x}{M-1}$$

A voltage detector (not shown), which may be a simple comparator-type circuit, may be used to sense the voltage across a corresponding fly capacitor $C_{Fx}$ with respect to a reference voltage, $V_{REF}$, which represents a desired target voltage for the fly capacitor $C_{Fx}$.

In essence, multi-level converters combine a charge-pump capacitive voltage converter with an inductor-based power converter in one structure. In a multi-level converter, the inductor L doubles as a virtual current source that moves all charge between the fly capacitors $C_{Fx}$. This creates a very efficient form of charge transfer, substantially mitigating or eliminating charge redistribution losses that inherently arise when capacitors with different voltages connect in parallel.

As noted above, one of the drawbacks of multi-level converters is that the fly capacitors $C_{Fx}$ can only change voltage by using the output load current to move energy in or out of them. When the load is light (e.g., zero or very low, such as less than about 10% of the absolute value of the maximum current specification for a typical converter), the fly capacitors $C_{Fx}$ cannot rebalance or re-adjust their voltages, even if provided with charge balancing circuitry. Balancing charge on the fly capacitors $C_{Fx}$ is necessary in order to maintain their average voltage and avoid stress on the switches. This characteristic is particularly a problem when there is a line-step at the input $V_{IN}$ of a multi-level converter, such as may occur when switching power supplies (e.g., from one battery to another, or from a battery to a rectified AC main line source). If $V_{IN}$ suddenly changes, the fly capacitors $C_{Fx}$ cannot re-adjust their respective voltages until a load current is present for a sufficiently long period of time.

For example, when $V_{IN}$ rises rapidly, then all states that are referenced to $V_{IN}$ will generally also rise by the same amount (for instance, in TABLE, 1, voltage levels 2a and 3 are both referenced to $V_{IN}$). For every middle voltage level (all levels other than voltage level 1 and the highest voltage level), all ground-referenced states stay at the same voltage as before the $V_{IN}$ change, and all states referenced to $V_{IN}$ rise the full amount of $V_{IN}$ change. A steady-state solution requires the ground-referenced states to rise and the $V_{IN}$-referenced states to fall so that the fly capacitors $C_{Fx}$ reach their respective target voltages. In the example in TABLE 1, for voltage level 2a, the voltage across fly capacitor C1 needs to settle to a new $V_{IN}/2$ value based on the increase in $V_{IN}$. To enable that settling (charge balancing), the output current of the converter is used to charge or discharge the fly capacitors $C_{Fx}$ so that their respective target voltages can be attained. However, if the output current is zero or very low, charge balancing may happen very slowly, if at all, which makes regulating the target output voltage $V_{OUT}$ of the converter difficult or impossible.

Conventional balancing circuits are known that can rebalance the fly capacitors $C_{Fx}$ but only by throwing energy away: they add additional current paths (such as current sources, resistors, etc.) to add or remove energy from the fly capacitors which, while accomplishing the task of balancing, is very energy wasteful. Further, the additional currents paths need to supply a large amount of current in order to rebalance the fly capacitors quickly.

The present invention encompasses circuits and methods that solve the light-load problem of a multi-level converter in an energy-efficient manner by generating a ripple signal in the control loop of the multi-level converter that causes a large output current ripple during light load conditions. This added current ripple does not change the average output current but does create a temporary positive and negative current that can be used to balance and charge/discharge the fly capacitors of the multi-level converter. An alternative energy-efficient approach is to add extra switching cycles for the fly capacitors when the output ripple current nears or crosses zero.

Example Control Circuitry for an M-level Converter Cell

Figure 4:
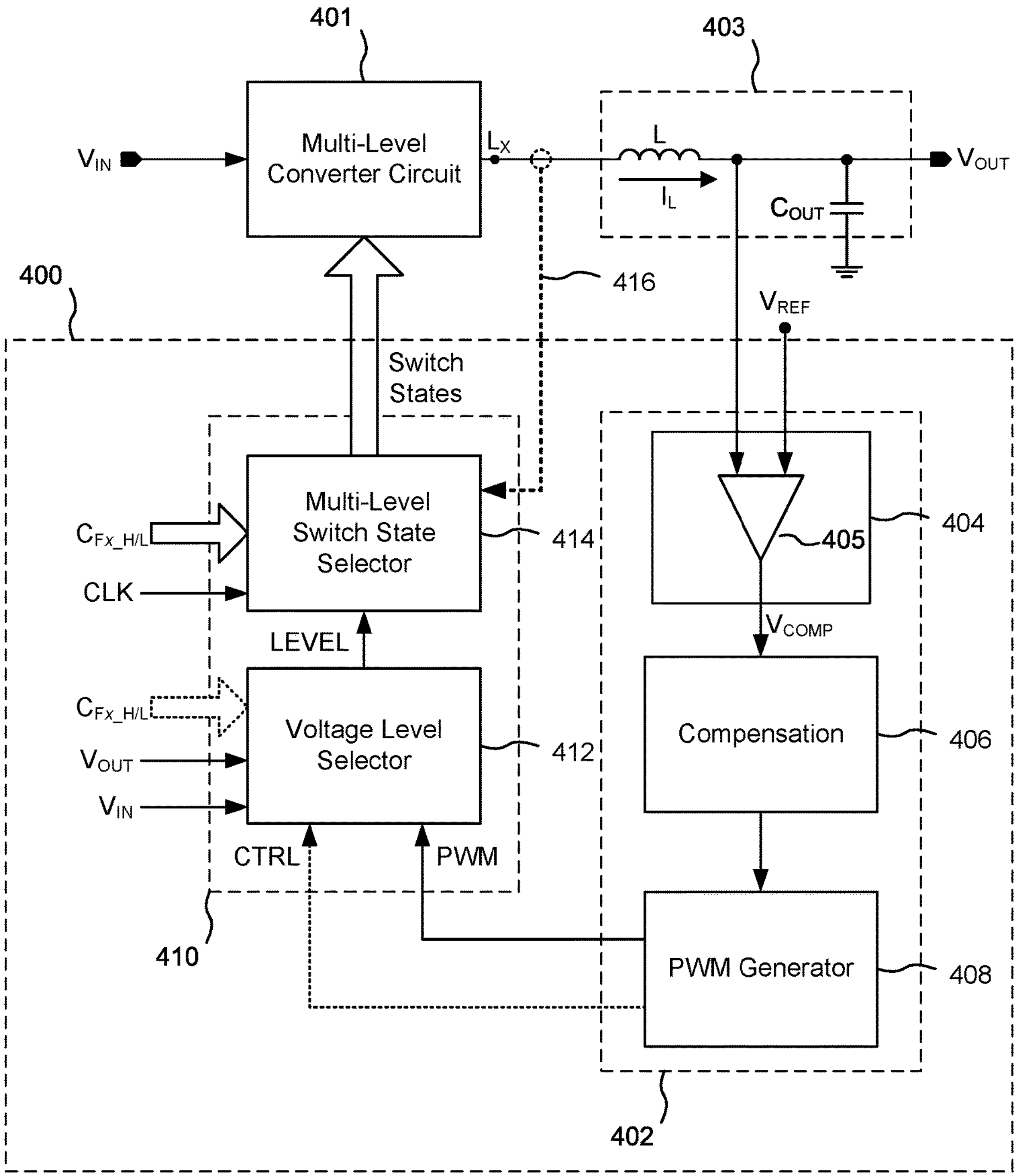
FIG. 4 is a block diagram of one embodiment of control circuitry for an M-level converter cell coupled to an output block comprising an inductor L and an output capacitor $C_{OUT}$.

FIG. 4 is a block diagram of one embodiment of control circuitry 400 for an M-level converter cell 401 coupled to an output block 403 comprising an inductor L and an output capacitor $C_{OUT}$ (conceptually, the inductor L also may be considered as being included within the M-level converter cell 401). This example control circuitry 400 is adapted from the teachings set forth in U.S. Patent Application Ser. No. 63/276,923, filed Nov. 8, 2021, entitled "*Controlling Charge-Balance and Transients in a Multi-Level Power Converter*", assigned to the assignee of the present invention, the contents of which are incorporated by reference. However, the present invention may be used in combination with other types of control circuitry for an M-level converter cell 401.

The control circuitry 400 functions as a control loop coupled to the output of the M-level converter cell 401 and to switch control inputs of the M-level converter cell 401. In general, the control circuitry 400 is configured to monitor the output (e.g., voltage and/or current) of the M-level converter cell 401 and dynamically generate a set of switch control inputs to the M-level converter cell 401 that attempt to stabilize the output voltage and/or current at specified values, taking into account variations of $V_{IN}$ and output load. In alternative embodiments, the control circuitry 400 may be configured to monitor the input of the M-level converter cell 401 (e.g., voltage and/or current) and/or an internal node of the M-level converter cell 401 (e.g., the voltage across one or more fly capacitors or the current through one or more power switches). Accordingly, most generally, the control circuitry 400 may be configured to monitor the voltage and/or current of a node (e.g., input terminal, internal node, or output terminal) of the M-level converter cell 401. The control circuitry 400 may be incorporated into, or separate from, the overall controller 104 for a power converter 100 embodying the M-level converter cell 401.

A first block comprises a feedback controller 402, which may be a traditional controller such as a fixed frequency voltage mode or current mode controller, a constant-ON-time controller, a hysteretic controller, or any other variant. The feedback controller 402 is shown as being coupled to $V_{OUT}$ from the M-level converter cell 401. In alternative embodiments, the feedback controller 402 may be configured to monitor the input of the M-level converter cell 401 and/or an internal node of the M-level converter cell 401. The feedback controller 402 produces a signal directly or indirectly indicative of the voltage at $V_{OUT}$ that determines in general terms what needs to be done in the M-level converter cell 401 to maintain desired values for $V_{OUT}$: charge, discharge, or tri-state (i.e., open, with no current flow).

In the illustrated example, the feedback controller 402 includes a feedback circuit 404, a compensation circuit 406, and a PWM generator 408. The feedback circuit 404 may include, for example, a feedback-loop voltage detector which compares $V_{OUT}$ (or an attenuated version of $V_{OUT}$) to a reference voltage which represents a desired $V_{OUT}$ target voltage (which may be dynamic) and outputs a control signal, $V_{COMP}$, to indicate whether $V_{OUT}$ is above or below the target voltage. The feedback-loop voltage detector may be implemented with a comparison device 405, such as an operational amplifier (op-amp) or transconductance amplifier (gm amplifier).

The compensation circuit 406 is configured to stabilize the closed-loop response of the feedback controller 402 by avoiding the unintentional creation of positive feedback, which may cause oscillation, and by controlling overshoot and ringing in the step response of the feedback controller 402. The compensation circuit 406 may be implemented in known manner, and may include LC and/or RC circuits. The PWM generator 408 generates the actual PWM control signal which ultimately sets the duty cycle of the switches of the M-level converter cell 401.

In some embodiments, the PWM generator 408 may pass on additional optional control signals CTRL indicating, for example, the magnitude of the difference between $V_{OUT}$ and the reference voltage (thus indicating that some levels of the M-level converter cell 401 should be bypassed to get to higher or lower levels), and the direction of that difference (e.g., $V_{OUT}$ being greater than or less than the reference voltage). In other embodiments, the optional control signals CTRL can be derived from the output of the compensation circuit 406, or from the output of the feedback circuit 404, or from a separate comparator (not shown) coupled to, for example, $V_{OUT}$. One purpose of the optional control signals CTRL is for advanced control algorithms, when it may be beneficial to know how far away $V_{OUT}$ is from a target output voltage, thus allowing faster charging of the inductor L if the $V_{OUT}$ is severely under regulated.

A second block comprises an M-level controller 410, the primary function of which is to select the switch states that generate a desired $V_{OUT}$ while maintaining a charge-balance state on the fly capacitors within the M-level converter cell 401 every time an output voltage level is selected, regardless of what switch state or states were used in the past.

The M-level controller 410 includes a Voltage Level Selector 412 which receives the PWM control signal and the additional control signals CTRL if available. In addition, the Voltage Level Selector 412 may be coupled to $V_{OUT}$ and/or $V_{IN}$, and, in some embodiments, to HIGH/LOW status signals, $C_{Fx\_H/L}$, from voltage detectors coupled to corresponding fly capacitors $C_{Fx}$ within the M-level converter cell 401. A function of the Voltage Level Selector 412 is to translate the received signals to a target output voltage level (e.g., on a cycle-by-cycle basis). The Voltage Level Selector 412 typically will consider at least $V_{OUT}$ and $V_{IN}$ to determine which target level should charge or discharge the output of the M-level converter cell 401 with a desired rate.

The output of the Voltage Level Selector 412 is coupled to an M-level Switch State Selector 414, which generally would be coupled to the status signals, $C_{Fx\_H/L}$, from the capacitor voltage detectors for the fly capacitors $C_{Fx}$. Taking into account the target level generated by the Voltage Level Selector 412, the M-level Switch State Selector 414 determines which switch state for the desired output level should be best for capacitor charge-balance. The M-level Switch State Selector 414 may be implemented, for example, as a look-up table (LUT) or as comparison circuitry and combinatorial logic or more generalized processor circuitry. The output of the M-level Switch State Selector 414 is coupled to the switches of the M-level converter cell 401 (through appropriate level-shifter circuits and drivers circuits, as may be needed for a particular converter cell) and includes the switch state settings determined by the M-level Switch State Selector 414 (which selects the configuration of switches within the M-level converter cell 401 corresponding to a selected target level).

In general (but not always), the Voltage Level Selector 412 and the M-level Switch State Selector 414 only change their states when the PWM signal changes. For example, when the PWM signal goes high, the Voltage Level Selector 412 selects which level results in charging of the inductor L and the M-level Switch State Selector 414 sets which version to use of that level. Then when the PWM signal goes low, the Voltage Level Selector 412 selects which level should discharge the inductor L and the M-level Switch State Selector 414 sets which version of that level to use. Thus, the Voltage Level Selector 412 and the M-level Switch State Selector 414 generally only change states when the PWM signal changes (the PWM signal is in effect their clock signal). However, there may be situations or events where it is desirable for the CTRL signals to change the state of the Voltage Level Selector 412. Further, there may be situations or events where it is desirable for the $C_{Fx\_H/L}$ status signal(s) from voltage detectors coupled to the fly capacitors $C_{Fx}$ within the M-level converter cell 401 to cause the M-level Switch State Selector 414 to select a particular configuration of power switch settings, such as when a severe mid-cycle imbalance occurs. In some embodiments, it may be useful to include a timing function that forces the M-level Switch State Selector 414 to re-evaluate the optimal version of the state periodically, for example, in order to avoid being "stuck" at one level for a very long time, potentially causing charge imbalances.

In embodiments that utilize the teachings set forth in the patent application entitled "*Controlling Charge-Balance and Transients in a Multi-Level Power Converter*" referenced above, the M-level controller 410 implements a control method for the M-level converter cell 401 that selects an essentially optimal switch state which moves the fly capacitors $C_{Fx}$ towards a charge-balance state every time a voltage level at the $L_X$ node is selected, regardless of what switch state or states were used in the past. Accordingly, such multi-level converter circuits are free to select a different switch state or $L_X$ voltage level every switching cycle without a need to keep track of any prior switch state or sequence of switch states.

One notable benefit of the control circuitry shown in FIG. 4 is that it enables generation of voltages in boundary zones between voltage levels, which represent unattainable output voltages for conventional multi-level DC-to-DC converter circuits.

In alternative unregulated charge-pumps embodiments, the feedback controller 402 and the Voltage Level Selector 412 may be omitted, and instead a clock signal CLK may be applied to the M-level Switch State Selector 414. The M-level Switch State Selector 414 would generate a pattern of switch state settings that periodically charge balances the fly capacitors $C_{Fx}$ regardless of what switch state or states were used in the past (as opposed to cycling through a pre-defined sequency of states). This ensures that if $V_{IN}$ changes or anomalous evens occur, the system generally always seeks charge balance for the fly capacitors $C_{Fx}$.

In some embodiments, the M-level Switch State Selector 414 may take into account the current $I_L$ flowing through the inductor L by way of an optional current-measurement input 416, which may be implemented in conventional fashion.

While FIG. 4 shows a particular embodiment of control circuitry for an M-level converter cell as modified in accordance with the present invention, it should be appreciated that other control circuits may be adapted or devised to provide suitable switching signals for the switches within a converter cell.

First Embodiment

Figure 5:
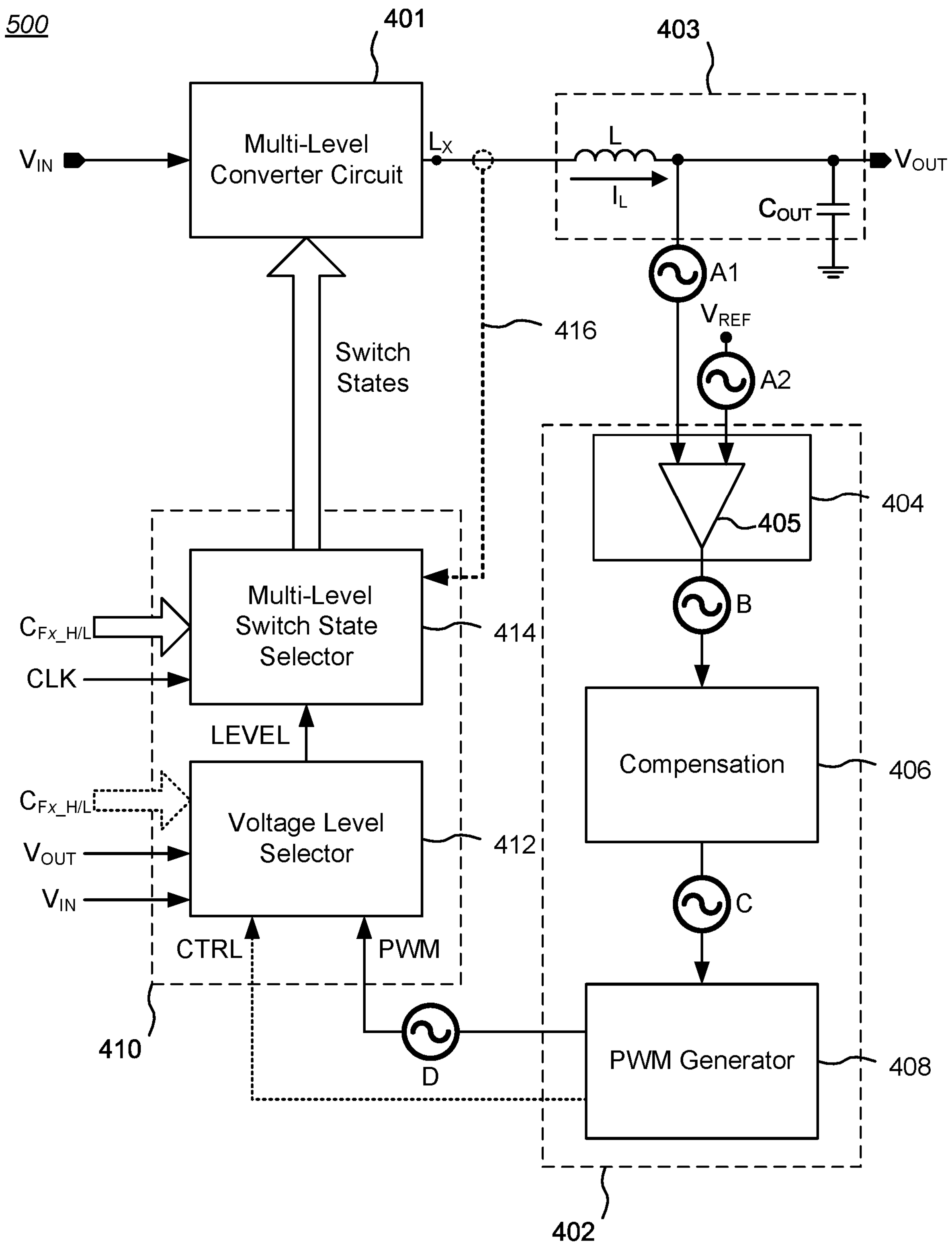
FIG. 5 is a block diagram of one embodiment of control circuitry for an M-level converter cell showing possible points of modification.

In accordance with the present invention, control circuitry the same as or similar to the control circuitry of FIG. 4 may be modified to solve the light-load problem of multi-level converters. FIG. 5 is a block diagram 500 of one embodiment of control circuitry for an M-level converter cell 401 showing possible points of modification. In particular, a "ripple" generator circuit may be inserted in the control feedback loop at one of several insertion nodes, configured to inject a sub-harmonic signal. While the details of the ripple generator circuit may vary somewhat from insertion node to insertion node, the function in each case is to induce a sub-harmonic ripple in the inductor L of a multi-level converter when light load conditions occur. The sub-harmonic ripple does not change the average output current through the inductor L but does create temporary positive and negative currents that can be used to balance and charge/discharge the fly capacitors $C_{Fx}$.

Injection of a sub-harmonic signal may occur at any of multiple insertion nodes, each insertion node offering different benefits and drawbacks. The sub-harmonic signal may be, for example, an AC waveform such as a square wave, a sinusoidal wave, a triangular (sawtooth) wave, so long as the average voltage of the imposed signal is zero. In some embodiments, a sub-harmonic signal may be injected by altering the timing of a digital waveform (e.g., a PWM signal).

By way of example, FIG. 5 shows four insertion nodes, A, B, C, and D, where injection of a sub-harmonic signal may be beneficial.

INSERTION NODE A1: Injecting a sub-harmonic signal at insertion node A1, thus modulating the feedback signal from $V_{OUT}$ to the input of the comparison device 405, is relatively straightforward to implement. A drawback of injecting the sub-harmonic signal at insertion node A1 is that the injected signal may be affected by the compensation circuit 406, since the injected subharmonic signal would also be filtered, thus making controlling the resulting amplitude more difficult. For example, if the injected signal was a 1V AC sinusoid, the filtering action of the compensation circuit 406 would reduce the effective amplitude of the injected signal. As another example, if the injected signal was a square wave, a low-pass filtering action in the compensation circuit 406 may make the injected signal look more sinusoidal.

INSERTION NODE A2: Injecting a sub-harmonic signal at insertion node A2, the reference side of the of the comparison device 405, has the same advantages and disadvantages as injecting at insertion node A1.

INSERTION NODE B: Injecting a sub-harmonic signal at insertion node B, the output of the comparison device 405, has the same advantages and disadvantages as injecting at insertion nodes A1 or A2, since injecting a signal on the output is the same as injecting it on an input, just divided by the gain of the comparison device 405.

INSERTION NODE C: Injecting a sub-harmonic signal at insertion node C, after the compensation circuit 406, can be very effective. For current mode control embodiments, the sub-harmonic signal may instead be injected in a current sense circuit (typically part of the PWM generator 408) to get the same effect.

INSERTION NODE D: Once a PWM signal is generated, a sub-harmonic signal may be injected at insertion node D by modulating the PWM duty-cycle so as to add a variable delay to the rising and/or falling edge of the PWM waveform. For example, referring to TABLE 1, in a particular converter cell cycle, if the duty cycle is 60% for Level 2a and 40% for Level 1a, a sub-harmonic generator may delay the falling edge of the Level 2a duty cycle so that the ratio is 65% to 35% for a cycle and then 55% to 45% for a next cycle, etc., thus on average preserving the selected 60%-40% ratio.

For each of insertion nodes A1, A2, B, C, and D, the injected sub-harmonic signal causes a change in the PWM signal that controls the duration (duty cycle) of the switching states for the M-level converter cell 401. As should be appreciated, there may be other insertion nodes and ways to inject a sub-harmonic signal waveform so long as the average voltage of the imposed signal is zero and the result induces a sub-harmonic ripple in the inductor L when light load conditions occur.

The injected sub-harmonic signal may be about one-half the switching frequency for the switches in the M-level converter cell 401 (e.g., switches QH2, QH1, QL1, QL2 in FIG. 3A). This results in the minimum loop interference and the minimum output ripple degradation. An even lower sub-harmonic frequency should make it easier to increase the charging/discharging current by keeping multiple subsequent cycles charging and discharging the fly capacitors $C_{Fx}$. However, such lower sub-harmonic frequencies may cause more system side-effects, like increased output current and voltage ripple.

Figure 6:
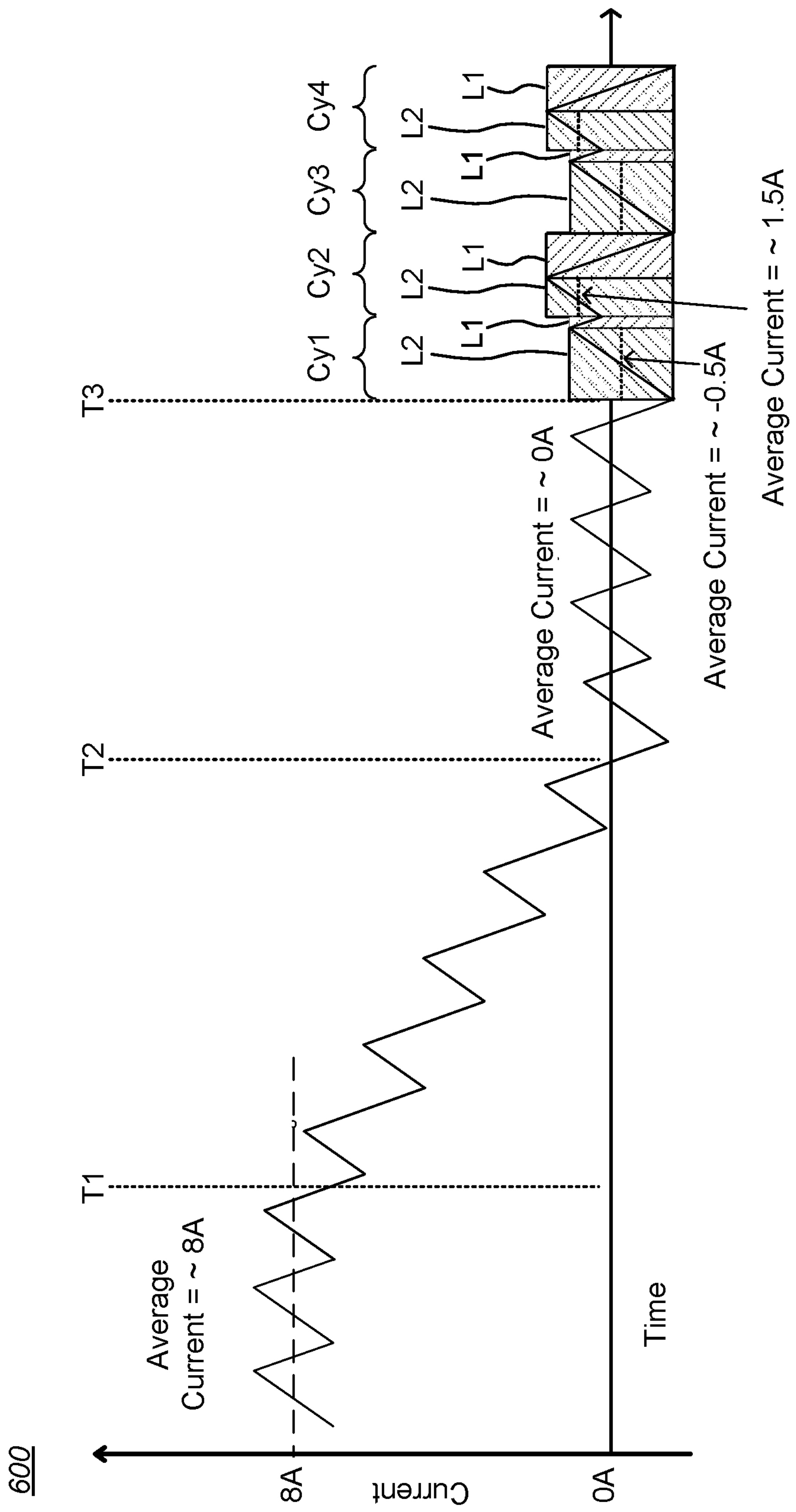
FIG. 6 is a graph of current through the inductor of a 3-level converter as a function of time under a first set of load conditions.

FIG. 6 is a graph 600 of current through the inductor of a 3-level converter as a function of time under a first set of load conditions. The 3-level converter may be, for example, like the converter shown in FIG. 3A, but with control circuitry like that shown in FIG. 5 having a sub-harmonic signal selectively injectable at a suitable insertion node.

In the illustrated example, the average current through the inductor L of the 3-level converter is about 8 amps up to time T1. When the inductor current is high, there is sufficient current to charge/discharge voltages on the fly capacitors $C_{Fx}$ in order to re-balance them. However, at time T1, the average inductor current decreases due to a lessened load (depicted as the time between T1 and T2). The average inductor current may come close to or reach about zero amps (depicted as the time between T2 and T3), when there would be insufficient current to re-balance the fly capacitors $C_{Fx}$.

Between times T2 and T3, there may be no need to inject a sub-harmonic signal into the control circuitry for the converter if there is sufficient residual voltage on the fly capacitors $C_{Fx}$ such that they are at or over their respective target voltages. However, once that residual voltage falls below the respective target voltages, such as under the light load condition at time T3, the fly capacitors $C_{Fx}$ cannot re-adjust their respective voltages to respond to a line-step until a load current is present for a sufficiently long period of time. Accordingly, when the average current through the inductor L of the converter comes close to or reaches about zero amps and the fly capacitors $C_{Fx}$ are out of balance, the associated control circuitry forces injection of a sub-harmonic signal (shown here as beginning at time T3) to help balance the fly capacitors $C_{Fx}$. This injected sub-harmonic ripple alters the duty cycle of the switching states for the M-level converter cell 401.

In the example shown in FIG. 6, and referring to TABLE 1, for a specified $V_{OUT}$, the 3-level converter alternates between voltage level 1 (L1) with an $L_X$ voltage of 0V and voltage levels 2a or 2b (2L) with an $L_X$ voltage of $V_{IN}/2$. A complete cycle (CyX) consists of some amount of time spent in L1 and some amount of time spent in L2. In the illustrated example, in complete cycle Cy1, the voltage level L2 duty cycle is increased and the voltage level L1 duty cycle is decreased. A longer L2 duty cycle in a complete cycle charges the inductor L more, increasing the inductor current so it is positive in the next complete cycle, Cy2 (in this example, about 1.5 A). Conversely, in complete cycle Cy2, the voltage level L1 duty cycle is increased and the voltage level L2 duty cycle is decreased. A longer L1 duty cycle in a complete cycle discharges the inductor L more, decreasing the inductor current so it is negative in the next complete cycle, Cy3 (in this example, about −0.5 A). In complete cycle Cy3, the L2 duty cycle is again increased and the L1 duty cycle is again decreased, which causes the average current in the inductor L in the next complete cycle, Cy4, to be positive. Similarly, in complete cycle Cy4, the L2 duty cycle is again decreased and the L1 duty cycle is again increased, which causes the average current in the inductor L in the next complete cycle (not shown) to be negative.

Importantly, the positive and negative excursions resulting from the injection of the sub-harmonic signal are sufficient to allow the fly capacitor $C_{Fx}$ voltages to be balanced by the re-balancing circuitry (not shown) in known manner.

Note that this process requires that the control circuitry take into account whether the average current through the inductor L is negative or positive. A negative average current requires inverting the required states of the switches in the M-level converter cell 401; thus, in the presence of negative current, a switch normally in a charging state should be set to a discharging state (sec also the discussion below regarding FIG. 8).

In some embodiments, it may be useful to inject a sub-harmonic signal only when the average current through the inductor L is about zero amps. In other embodiments, it may be useful to scale the degree of injection of a sub-harmonic signal as a function of the absolute value of the average current through the inductor L. This approach allows for smoother transitions and avoids sudden mode changes that can be problematic to system response. Scaled injection of a sub-harmonic signal can be relatively easy to implement in current-mode control systems where the target current is easily available. A scalable injected sub-harmonic signal may be scaled in amplitude, or by altering the duty cycle of injection (i.e., full-scale injection for a period of time and then OFF for a period of time to obtain an averaged amount of injected sub-harmonic signal), or some combination of the two methods.

Figure 7:
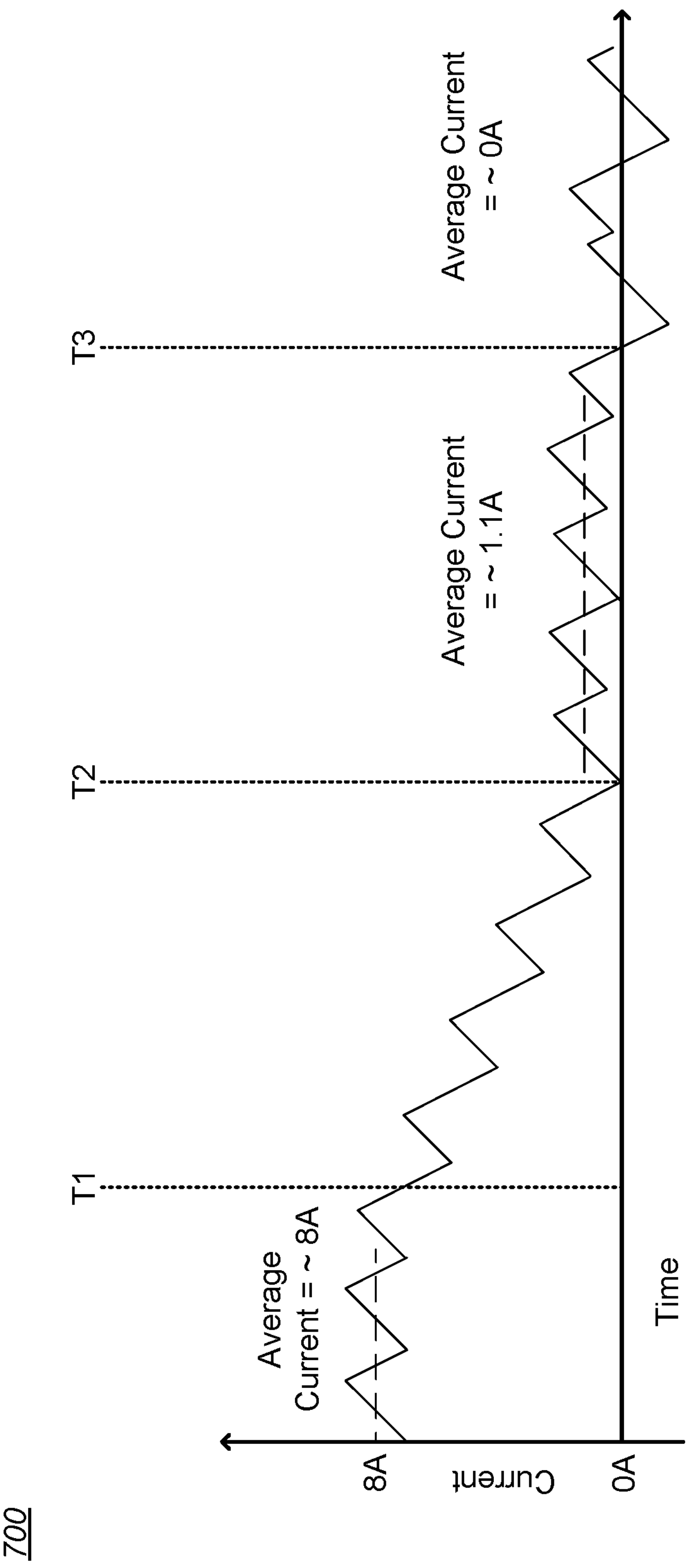
FIG. 7 is a graph of current through the inductor of a 3-level converter as a function of time under a second set of load conditions.

For example, FIG. 7 is a graph 700 of current through the inductor of a 3-level converter as a function of time under a second set of load conditions. The 3-level converter may be, for example, like the converter shown in FIG. 3A, but with control circuitry like that shown in FIG. 5 having a sub-harmonic signal selectively injectable at a suitable insertion node.

In the illustrated example, the average current through the inductor L of the 3-level converter is about 8 amps up to time T1. At time T1, the output load drops and the average inductor current decreases (depicted as the time between T1 and T2) and may approach zero amps (depicted as the time between T2 and T3). In the illustrated example, the average current through the inductor L between times T1 and T2 is about 1.1 A. Accordingly, it may be useful to begin injecting the sub-harmonic signal to some degree less than the maximum amount available, in order to enable some charge balancing to occur. If the absolute average current continues to drop (e.g., as depicted after time T3), the amount of injected sub-harmonic signal may increase up to the maximum amount available.

In implementation of some embodiments, a multi-level controller needs to predict whether a present sub-harmonic injection cycle is going to result in a positive or a negative average current. For a negative average current, the controller needs to reverse the definitions of which switch states charge and discharge the fly capacitor(s) $C_{Fx}$. For example, referring to FIG. 3A and TABLE 1 above, voltage level 2a is a normally considered to be a charging state which couples $V_{IN}$ to the inductor L1 through switch QH2, fly capacitor C1, and switch QL1. Conversely, voltage level 2b is a normally considered to be a discharging state which couples circuit ground to the inductor L1 through switch QL2, fly capacitor C1, and switch QH1. However, these state designations assume an average positive current flow through the inductor L. If the average current flow through the inductor L is negative, then voltage level 2a would be considered to be a discharging state, with current flowing from the inductor L to the $V_{IN}$ terminal, and voltage level 2b would be considered to be a charging state, with current flowing from the inductor L to circuit ground. More generally, when the average current is negative, fly capacitors $C_{Fx}$ that normally would have switch states set to charge instead reverse their switch states to complementary settings, and fly capacitors $C_{Fx}$ that normally would have switch states set to discharge instead reverse their switch states to complementary settings.

Figure 8:
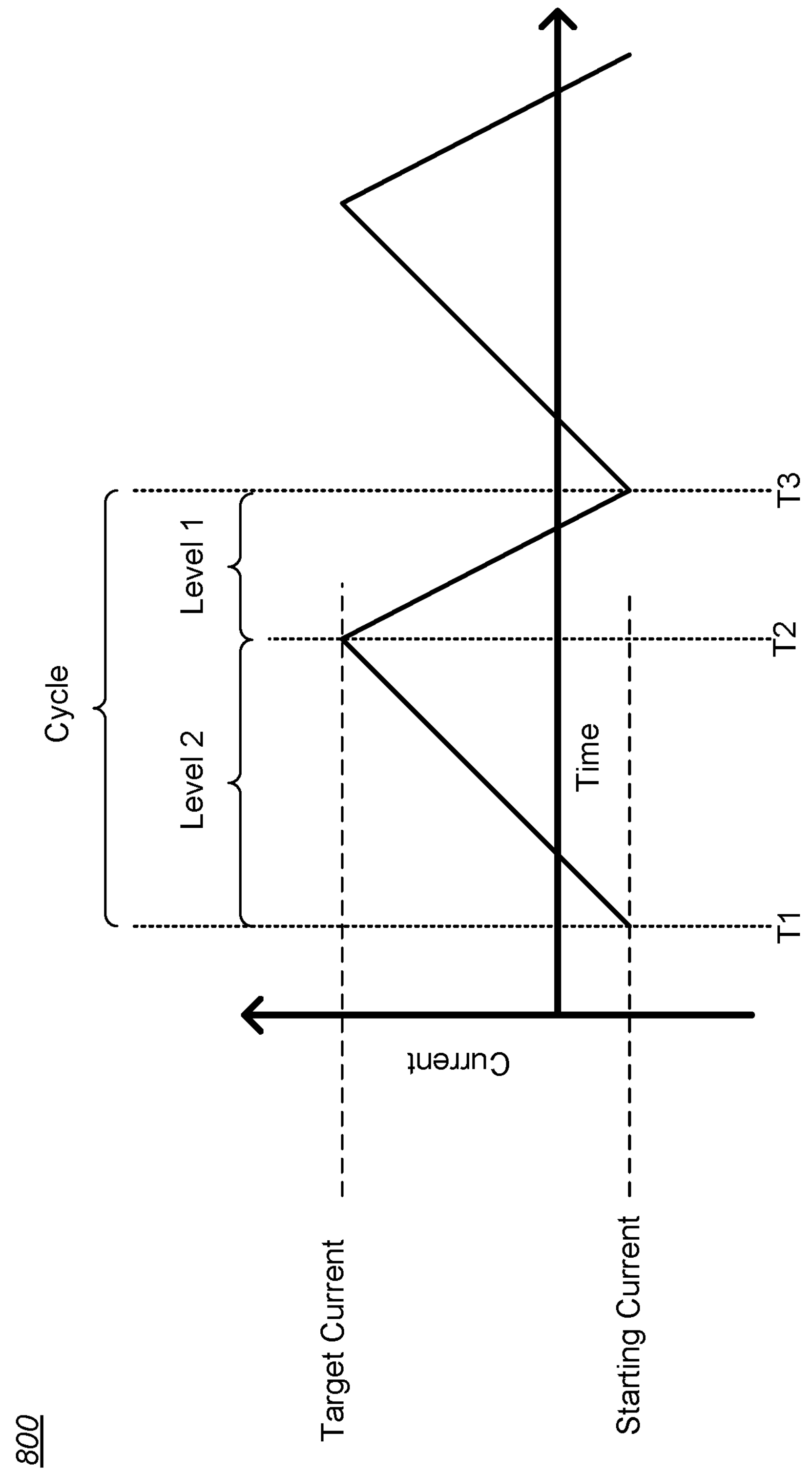
FIG. 8 is a graph of current through the inductor of a multi-level converter as a function of time under conditions which may result in negative current flow through the inductor.

FIG. 8 is a graph 800 of current through the inductor of a multi-level converter as a function of time under conditions which may result in negative current flow through the inductor. The graph 800 shows a sub-harmonic injection cycle having a starting current, which can be determined by measurement, and a target current, which is determined by the control circuitry 400 taking into account the injection of the sub-harmonic signal. The method for predicting whether a sub-harmonic injection cycle is going to result in a positive or a negative average current may depend on the type of converter controller.

For fixed-frequency peak current-mode controllers, at each cycle, for the rising edge (i.e., between times T1 and T2 in the illustrated example), the current at the beginning of the rising edge (e.g., at time T1) is measured. The current at the end of the rising edge (e.g., at time T2) may be readily estimated from the voltage, $V_{COMP}$, output by the comparison device 405 (see FIG. 4). The value of $V_{COMP}$ is proportional to the target current, thus it can be determined what the final output current should be—in essence, the $V_{COMP}$ voltage is being used as a surrogate to predict the output current. An average of those two values is then calculated. If the calculated average current is negative, then the controller needs to reverse the definitions of which switch states charge and discharge the fly capacitor(s) $C_{Fx}$, as described above. For the falling edge (i.e., between times T2 and T3 in the illustrated example), the current at the beginning of the falling edge (e.g., at time T2) is measured and an end-point current (e.g., at time T3) is estimated by knowing how much time is left in the fixed-frequency cycle and the inductance of and voltage across the inductor L. An average of those two values is then calculated. Again, if the calculated average current is negative, then the controller needs to reverse the definitions of which switch states charge and discharge the fly capacitor(s) $C_{Fx}$, as described above.

For fixed-frequency voltage-mode controllers, at each cycle, for the rising edge (i.e., between times T1 and T2 in the illustrated example), the current at the beginning of the rising edge (e.g., at time T1) is measured. The time required to reach time T2 is known—this is what the COMP voltage sets. The inductance of and voltage across the inductor L may be used to calculate a final current at the end of the rising edge (e.g., at time T2). An average of those two values is then calculated. If the calculated average current is negative, then the controller needs to reverse the definitions of which switch states charge and discharge the fly capacitor(s) $C_{Fx}$, as described above. For the falling edge (i.e., between times T2 and T3 in the illustrated example), the current at the beginning of the falling edge (e.g., at time T2) is measured and an end-point current (e.g., at time T3) is estimated by knowing how much time is left in the fixed-frequency cycle and the inductance of and voltage across the inductor L. An average of those two values is then calculated. Again, if the calculated average current is negative, then the controller needs to reverse the definitions of which switch states charge and discharge the fly capacitor(s) $C_{Fx}$, as described above.

Second Embodiment

As an alternative to injecting a sub-harmonic signal into the control loop feedback path of a multi-level converter, the same result can be achieved by sensing the current through the inductor L in real-time and adding extra switching cycles (noting that the current that flows through the inductor L can be sensed in multiple paths within the converter). All that is required is sensing when the current through the inductor L nears or crosses zero (i.e., is neither significantly positive nor negative) from negative to positive (a positive transition) or from positive to negative (a negative transition), and reprogramming the M-level Switch State Selector 414 (see FIG. 5) to switch the charging/discharging states of the fly capacitors $C_{Fx}$. Stated another way, extra switching cycles are added at a near-zero current level that results in moving the voltage of the fly capacitors towards a target value.

Figure 9A:
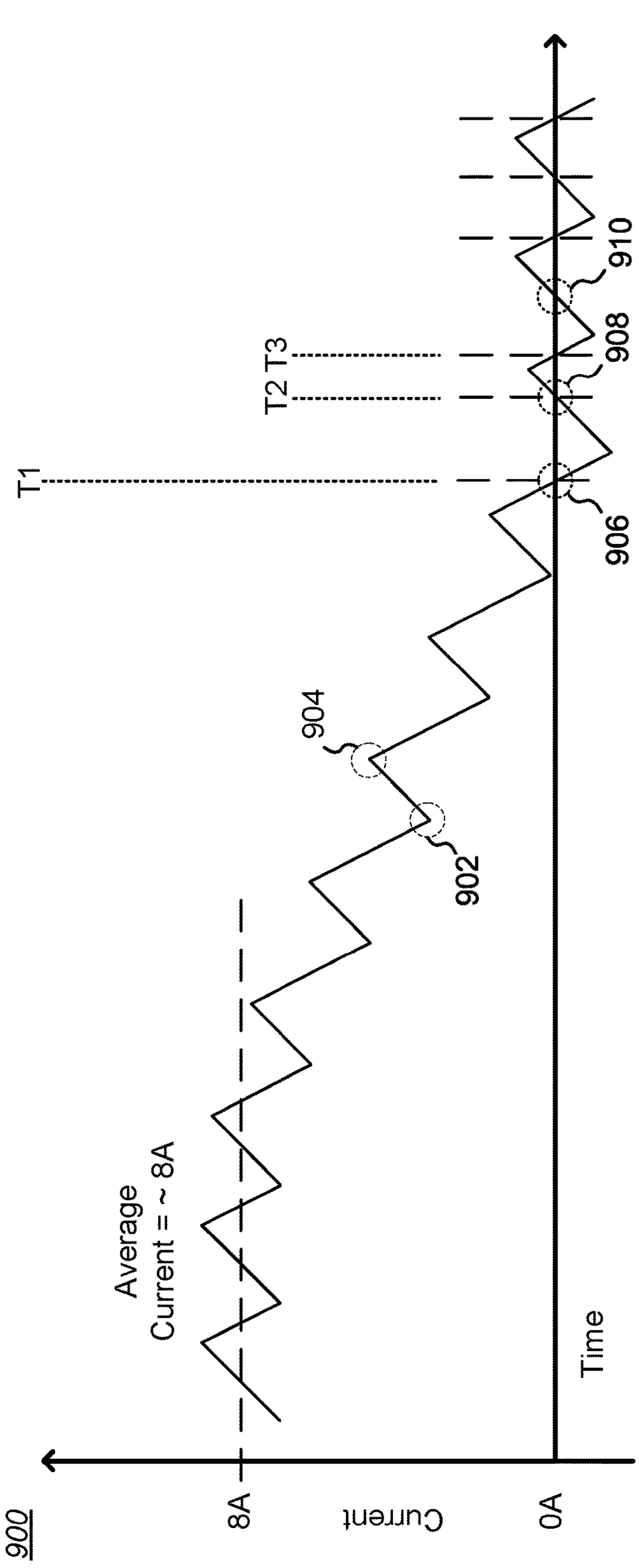
FIG. 9A is a graph of current through the inductor L of a multi-level converter as a function of time, showing the addition of switching cycles to improve light load recovery.

FIG. 9A is a graph 900 of current through the inductor L of a multi-level converter as a function of time, showing the addition of switching cycles to improve light load recovery. Transitions from negative-going to positive-going, like the example inflection point in circle 902, indicate the start of charging current flow into the inductor L. Transitions from positive-going to negative-going, like the example inflection point in circle 904, indicate the start of discharging current flow from the inductor L.

In "added cycle" embodiments, when the output load drops, extra inductor charging cycles or discharging cycles are added. For example, at time T1 in FIG. 9A, the conditions are suitable to add extra cycles. Accordingly, at zero-crossing points, like the example zero-crossing points in circles 906 and 908, the state of the then-current charging cycle is reversed. For example, at zero-crossing point 906, the switch states for the then-current discharging cycle are reversed to maintain discharging or discharging of the fly capacitors when the current reverses. As another example, at zero-crossing point 908, the switch states for the then-current charging cycle are reversed to provide an added discharging cycle. The number and spacing of added charging/discharging cycles may be adjusted as need be in order to scale the degree of light load recovery needed for a particular state of the multi-level converter.

Figure 9B:
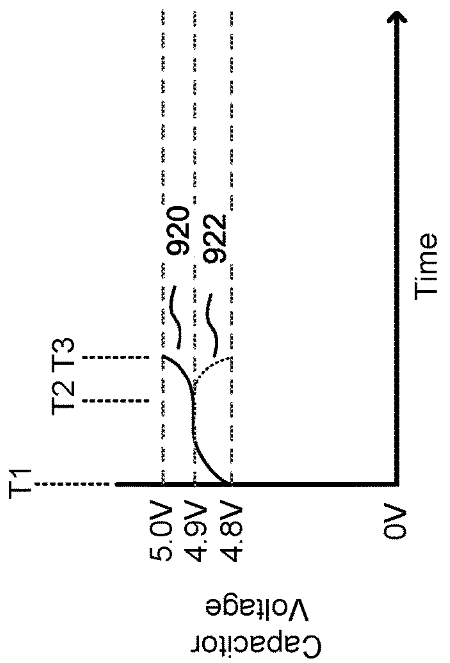
FIG. 9B is a graph of the voltage on a particular fly capacitor C of a multi-level converter as a function of time.

FIG. 9B is a graph of the voltage on a particular fly capacitor C of a 3-level multi-level converter as a function of time. The target voltage for fly capacitor C may be 5V, but at time T1 (corresponding to time T1 in FIG. 9A), the voltage across fly capacitor C may be, for example, only 4.8V. The Level selected for the converter at time T1 is set to discharge the inductor L, and the switch states are selected to charge the fly capacitor C.L. However, at zero-crossing point 906, the switch states for the then-current inductor discharging cycle are reversed (inverted) when the inductor current reverses. This maintains the output level while allowing the fly capacitor C to continue charging with the reversed current flow. Note that the inductor L can be discharged when the switch states are set for level 3 or level 2b, while only level 2b can charge the fly capacitor C during an inductor discharging cycle. In this example, as graph line 920 shows, the fly capacitor C charges to about 4.9V between times T1 and T2.

At time T2 in FIG. 9B, since the voltage across fly capacitor C is still below the target of 5V, at zero-crossing point 908, the switch states for the then-current inductor charging cycle are reversed to provide yet another added capacitor charging cycle—noting that the inductor L can be charged when the switch states are set for level 1 or level 2a, while only level 2a can charge the fly capacitor C during an inductor charging cycle. In this example, as graph line 920 shows, the fly capacitor C charges to about 5V between times T2 and T3. In the absence of an extra capacitor charging cycle, the charge on the fly capacitor C would decrease, as indicated by graph line 922.

Benefits of "added cycle" embodiments include the lack of necessity for ripple generator circuitry, case of implementation, no extra transition losses since switching happens when the load is zero, and enabling fast re-balancing of fly capacitors $C_{Fx}$ if a sufficiently large inductor ripple is present. In some embodiments, cycles may be added only when required. For example, extra cycles may be added only if the fly capacitors $C_{Fx}$ are sufficiently imbalanced from their target voltages, thus avoiding extra cycles if the capacitors $C_{Fx}$ are in an acceptable range. Thus, for instance, at zero-crossing point 910, no additional discharging cycle may be needed. As another example, the controller may decide to only execute a charging cycle and/or a discharging cycle if the cycle is long enough. In some scenarios the charging/discharging cycle is so short, such as the minimum OFF time, that the "added cycle" process would have little benefit.

Figure 10:
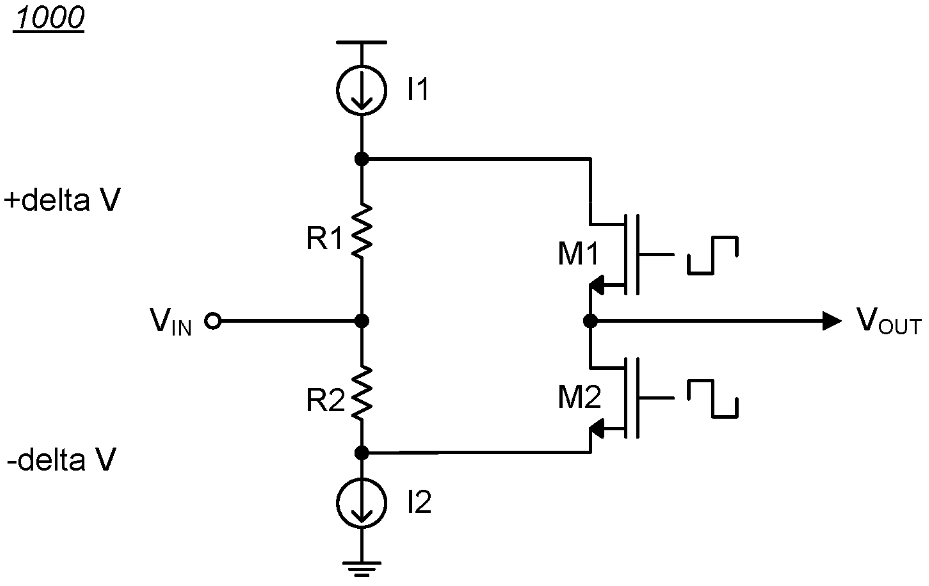
FIG. 10 is a schematic diagram of one embodiment of a sub-harmonic signal generation circuit.

The "added cycle" technique may be used in multi-level converters that include the circuitry for sub-harmonic signal generation. For example, for minor deviations of the voltages on the fly capacitors $C_{Fx}$ relative to their respective target voltages, it may be useful to use the added cycle technique as being fast and having less impact on the controller loop. For larger excursions of voltages on the fly capacitors $C_{Fx}$, it may be more efficient to use a sub-harmonic signal generator. In some cases, it may be useful to use both the added cycle technique and a sub-harmonic signal generator concurrently—the sub-harmonic signal can increase the current to be larger, and the added cycle (zero crossing) technique on top of that can be used to ensure that all current flowing through the fly capacitors is used to charge or discharge, Example Sub-Harmonic Signal Generation Circuits FIG. 10 is a schematic diagram of one embodiment of a sub-harmonic signal generation circuit 1000. The illustrated sub-harmonic signal generation circuit 1000 may be used, for example, at any of insertion nodes A1, A2, B, or C in the control circuitry shown in FIG. 5. Paired resistors R1, R2 between current sources I1, I2 provide respective positive and negative I×R voltage drops for an input signal $V_{IN}$ to create a time-varying output signal $V_{OUT}$ that has an average voltage equal to $V_{IN}$. In an example embodiment, the current sources I1, I2 may provide about 10 μA of current and the resistors R1, R2 have a value of about 1 KΩ each.

A first MOSFET M1 is coupled in parallel with the resistor R1 and has its gate modulated by a sub-harmonic frequency (e.g., one-half the switching frequency for the switches in an associated converter cell). Similarly, a second MOSFET M2 is coupled in parallel with the resistor R2 and has its gate modulated by the sub-harmonic frequency. In the illustrated example, the sub-harmonic frequency is applied to the gates of the MOSFETs M1 and M2 in the form of complementary square waves. Accordingly, the MOSFET M1 in an ON state couples a positively offset voltage $V_{IN}$+I×R1 to $V_{OUT}$ every half cycle of its square wave, while the MOSFET M2 in an ON state couples a negatively-offset voltage $V_{IN}$−I×R2 to $V_{OUT}$ every half cycle of its square wave. Thus, the output voltage $V_{OUT}$ periodically varies between (1) $V_{IN}$+I×R1 and (2) $V_{IN}$−I×R2, which averages to $V_{IN}$.

Figure 11:
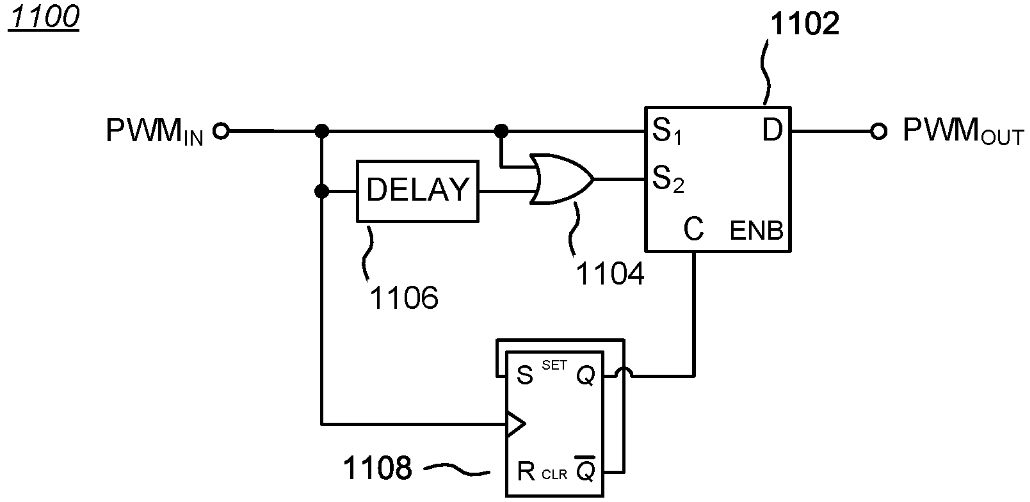
FIG. 11 is a schematic diagram of one embodiment of a sub-harmonic PWM edge delay circuit.

FIG. 11 is a schematic diagram of one embodiment of a sub-harmonic PWM edge delay circuit 1100. A PWM signal $PWM_{IN}$ is shown being applied to a first input, S1, of a multiplexer 1102, to a first input of an OR gate 1104, to the input of a delay circuit 1106, and to the clock input of a conventional SR flip-flop 1108. The output of the delay circuit 1106 is coupled to a second input of the OR gate 1104. The output of the OR gate 1104 is coupled to a second input, S2, of the multiplexer 1102. The Q output of the SR flip-flop 1108 is coupled to the selection input C of the multiplexer 1102. The Q-BAR output of the SR flip-flop 1108 is coupled to the set input S of the SR flip-flop 1108. The output D of the multiplexer 1102 is an edge-delayed version $PWM_{OUT}$ of the input signal $PWM_{IN}$.

In operation, when $PWM_{IN}$ transitions from 0 (low) to 1 (high), the SR flip-flop 1108 toggles its output state (that is, the SR flip-flop 1108 is triggered by the positive going edge of $PWM_{IN}$ transitions). Assuming the first (e.g., odd) positive pulse of the $PWM_{IN}$ signal causes the SR flip-flop 1108 Q output to go low. Accordingly, for the first $PWM_{IN}$ pulse, the multiplexer 1102 will select the first input S1 and the output D of the multiplexer 1102 will be the positive $PWM_{IN}$ pulse unmodified. The second (e.g., even) positive pulse of the $PWM_{IN}$ signal will toggle the SR flip-flop 1108, causing the SR flip-flop 1108 Q output to go high. Accordingly, for the second $PWM_{IN}$ pulse, the multiplexer 1102 will select the second input S2 and the output D of the multiplexer 1102 will be the positive $PWM_{IN}$ pulse stretched longer by OR'ing in a delayed version of $PWM_{IN}$ through the delay circuit 1106. The SR flip-flop 1108 thus alternatively selects either the normal $PWM_{IN}$ pulse or the stretched positive pulse as the $PWM_{OUT}$ signal.

Additional Control and Operational Considerations

In power converters, particularly multi-level power converters, the power switches may be implemented with FETs, especially MOSFETs. For each power FET, a driver circuit is generally required. In addition, for some power FETs, a level shifter may be required to translate ground-referenced low-voltage logic ON/OFF signals from an analog or digital controller into a signal with the same voltage swing but referenced to the source voltage of the power FET that the signal is driving in order to charge or discharge the gate of the power FET and thereby control the conducting or blocking state of the power FET. In some applications, the functions of a level shifter and a driver circuit may be incorporated into one circuit.

It may be desirable to provide additional control and operational circuitry (or one or more shutdown procedures) that enables reliable and efficient operation of a power converter utilizing a multi-level converter cell designed in accordance with the present disclosure. For example, in a step-down power converter, the output voltage of a converter cell is less than the input voltage of the converter cell. Shutting down or disabling (e.g., because of a fault event, such as a short) a converter cell having a designed-in inductance connected to the output while the output load current is non-zero generally requires some means for discharging the inductor current. In some embodiments, a bypass switch may be connected in parallel with a designed-in inductance connected to the output of a converter cell and controlled to be open during normal operation and closed when shutting down the converter cell or if a fault event occurs. Ideally, in order to prevent transient ringing and to provide safe discharge of the inductor current, the bypass switch can be closed before disabling converter cell switching. In alternative embodiments using MOSFETs for the main switches of the converter, the inherent body diode connected between the body and drain terminals of each MOSFET can also discharge the inductor current. Details of these solutions, as well as alternative shutdown solutions, are taught in U.S. Pat. No. 10,686,367, issued June 16, 2020, entitled "*Apparatus and Method for Efficient Shutdown of Adiabatic Charge Pumps*", assigned to the assignee of the present invention, the contents of which are incorporated by reference.

Another consideration when combining converter cells in parallel is controlling multiple parallel power converters in order to avoid in-rush current (e.g., during a soft-start period for the power converters) and/or switch over-stress if all of the power converters are not fully operational, such as during startup or when a fault condition occurs. Conditional control may be accomplished by using node status detectors coupled to selected nodes within parallel-connected power converters to monitor voltage and/or current. Such node status detectors may be configured in some embodiments to work in parallel with an output status detector measuring the output voltage of an associated power converter during startup. The node status detectors ensure that voltages across important components (e.g., fly capacitors and/or switches) within the converter cell(s) of the power converters are within desired ranges before enabling full power steady-state operation of the parallel power converters, and otherwise prevent full power steady-state operation. The node status detectors may be coupled to a master controller that controls one or more of the parallel power converters using one or more common control signals. In furtherance of a master controller configuration, the parallel power converters may each report a power good signal (Pgood) when ready to leave a startup phase for full power steady-state operation. The master controller may essentially "AND" all such Pgood signals together, possibly along with one or more status signals from other circuits, such that the master controller does not enable full power steady-state operation of any the parallel power converter unless all of the parallel power converters are ready for that state. In essence, the Pgood signals from each parallel power converter are all tied together such that the parallel power converters may not transition out of startup phase until all the Pgood signals indicate that they are ready to transition to steady operation. Furthermore, if the Pgood signal changes due to a fault condition in one or more of the parallel power converters, the parallel power converters can transition from a steady state operation to an auto-restart or shutdown operation. Details of these solutions, as well as alternative shutdown solutions, are taught in U.S. Pat. No. 10,992,226, issued Apr. 27, 2021, entitled "*Startup Detection for Parallel Power Converters", assigned to the assignee of the present invention, the contents of which are incorporated by reference.*

Another consideration in operating multi-level converter cells is attaining (i.e., pre-charging) and maintaining fly capacitor voltages that are essentially fully proportionally balanced so that all switches are subjected to a similar voltage stress, since unbalanced fly capacitors can lead to breakdown of a switch (particularly FET switches) due to exposure to high voltages. One solution to both pre-charging capacitor voltages and operational balancing of capacitor voltages in a multi-level DC-to-DC converter circuit is to provide a parallel "shadow" circuit that conditionally couples a fly capacitor to a voltage source or other circuit to pre-charge that capacitor, or conditionally couples two or more fly capacitors together to transfer charge from a higher voltage capacitor to a lower voltage capacitor, or conditionally couples a fly capacitor to a voltage sink to discharge that capacitor, all under the control of real-time capacitor voltage measurements. Each parallel "shadow" circuit may comprise a switch and a resistor coupled in parallel with a main switch that is part of a multi-level converter cell (in some cases, one switch-resistor pair may span two series-connected switches). This particular solution for pre-charging and/or balancing charge on fly capacitors is very fast, provides slow pre-charging of the fly capacitors during a pre-charge period, protects switches from in-rush current, and provides stable voltages for converter cell switches. Details of this solution, as well as alternative pre-charging and charge balancing solutions, are taught in U.S. Pat. No. 10,720,843, issued Jul. 21, 2020, entitled "*Multi-Level DC-DC Converter with Lossy Voltage Balancing*", assigned to the assignee of the present invention, the contents of which are incorporated by reference.

Another solution to balancing capacitor voltages in a multi-level DC-to-DC converter circuit is to provide a lossless voltage balancing solution where out-of-order state transitions of a multi-level DC-to-DC converter cell are allowed to take place during normal operation. The net effect of out-of-order state transitions is to increase or decrease the voltage across specific fly capacitors, thus preventing voltage overstress on the main switches of the DC-to-DC converter. In some embodiments, restrictions are placed on the overall sequence of state transitions to reduce or avoid transition state toggling, thereby allowing each capacitor an opportunity to have its voltage steered as necessary, rather than allowing one capacitor to be voltage balanced before voltage balancing another capacitor. Details of this solution, as well as alternative charge balancing solutions, are taught in U.S. Pat. No. 10,770,974, issued Sep. 8, 2020, entitled "*Multi-Level DC-DC Converter with Lossless Voltage Balancing*", assigned to the assignee of the present invention, the contents of which are incorporated by reference.

An additional consideration for some embodiments is enabling operation of multi-level converter cells such that voltages can be generated in boundaries zones between voltage levels. "Boundary zones" represent unattainable output voltages for conventional multi-level DC-to-DC converter circuits. In order to generate output voltages within a boundary zone, some embodiments essentially alternate (toggle) among adjacent (or even nearby) zones by setting states of the converter cell switches in a boundary zone transition pattern. For example, a 3-level DC-to-DC converter circuit may operate in Zone 1 for a selected time and in adjacent Zone 2 for a selected time. Thus, Zones 1 and 2 are treated as a single "super-zone". More generally, in some cases, it may be useful to create super-zones using non-adjacent zones or using more than two zones (adjacent and/or non-adjacent). Details of this solution are taught in U.S. Pat. No. 10,720,842, issued Jul. 21, 2020, entitled "*Multi-Level DC-DC Converter with Boundary Transition Control*", assigned to the assignee of the present invention, the contents of which are incorporated by reference.

Yet another consideration for some embodiments is protection of the main power switches and other components within a power converter from stress conditions, particular from voltages that exceed the breakdown voltage of such switches (particularly FET switches). One means for protecting a multi-level power converter uses at least one high-voltage FET switch while allowing all or most other main power switches to be low-voltage FET switches.

As should be clear, the multi-level power converter embodiments described in this disclosure may be synergistically combined with the teachings of one or more of the additional control and operational circuits and methods described in this section.

Methods

Figure 12:
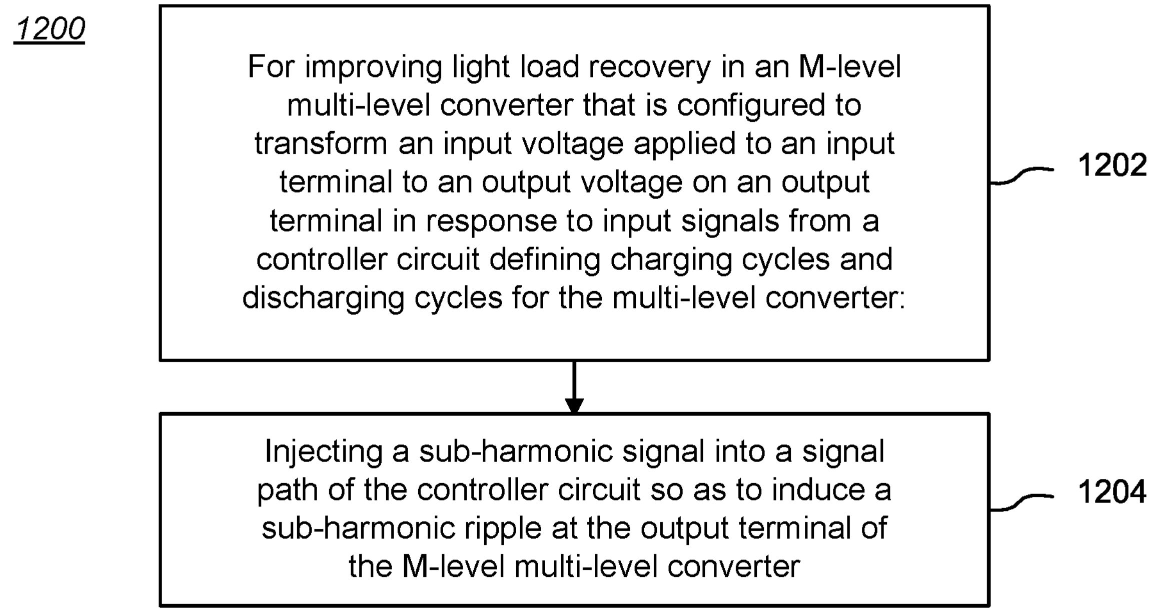
FIG. 12 is a process flow chart showing a first method of improving light load recovery in an M-level multi-level converter.

Another aspect of the invention includes methods for improving light load recovery in an M-level multi-level converter (where "light load" means the load is zero or very low, such as less than about 10% of the absolute value of the maximum current specification for a typical converter). For example, FIG. 12 is a process flow chart 1200 showing a first method of improving light load recovery in an M-level multi-level converter. Starting with an M-level multi-level converter that is configured to transform an input voltage applied to an input terminal to an output voltage on an output terminal in response to input signals from a controller defining charging cycles and discharging cycles for the multi-level converter (Block 1202), the method includes: injecting a sub-harmonic signal into a signal path of the controller so as to induce a sub-harmonic ripple at the output terminal of the M-level multi-level converter (Block 1204).

Additional aspects of the above method may include one or more of the following: wherein the controller includes a comparator having an input coupled to the output terminal, further including selectively injecting the sub-harmonic signal in a signal path between the output terminal and the comparator; wherein the controller includes a comparator having a reference voltage input, further including selectively injecting the sub-harmonic signal at the reference voltage input; wherein the controller includes a compensation circuit, and further including selectively injecting the sub-harmonic signal in a signal path before or after the compensation circuit; wherein the controller includes a pulse-width modulation generator, further including selectively injecting the sub-harmonic signal in a signal path after the pulse-width modulation generator; further including selectively injecting the sub-harmonic signal when an average current through the output terminal is approximately zero amps; further including selectively injecting the sub-harmonic signal when a light load is present on the output terminal; further including selectively injecting a scaled sub-harmonic signal as a function of the absolute value of the average current through the output terminal; wherein the M-level multi-level converter has a switching frequency, and the sub-harmonic signal has a frequency about one-half the switching frequency of M-level multi-level converter; wherein the M-level multi-level converter has a switching frequency, and the sub-harmonic signal has a frequency less than one-half the switching frequency of the M-level multi-level converter; wherein the sub-harmonic signal enables charge balancing of at least one fly capacitor in the M-level multi-level converter; wherein the sub-harmonic signal creates temporary positive and negative currents sufficient to enable charge balancing of at least one fly capacitor in the M-level multi-level converter; wherein the sub-harmonic signal is an AC waveform; wherein the sub-harmonic signal is an AC waveform having an average voltage of zero; wherein the sub-harmonic signal is injected by altering the timing of a digital waveform generated by the controller that controls operation of the M-level multi-level converter; and/or wherein the input signals from the controller include a pulse-width modulated waveform, further including selectively injecting the sub-harmonic signal by altering the timing of the pulse-width modulated waveform.

Figure 13:
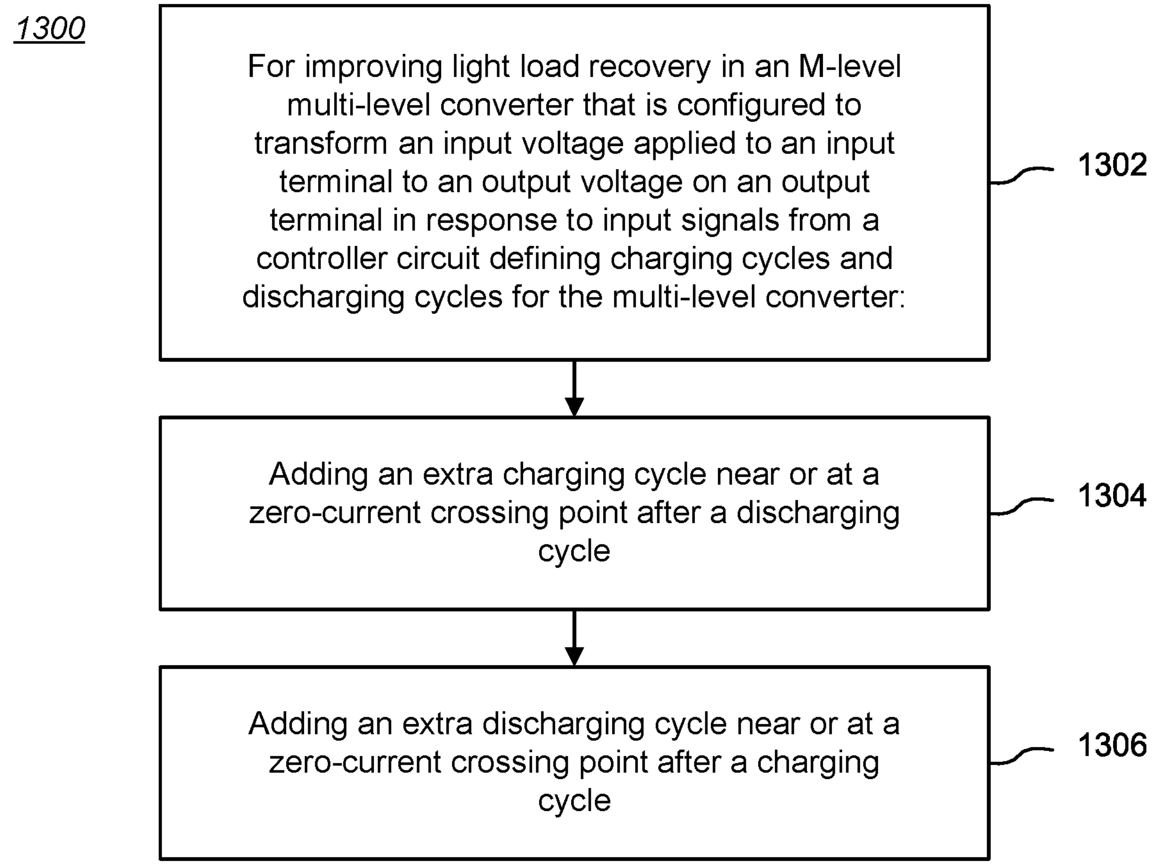
FIG. 13 is a process flow chart showing a second method of improving light load recovery in an M-level multi-level converter.

As another example, FIG. 13 is a process flow chart 1300 showing a second method of improving light load recovery in an M-level multi-level converter. Starting with an M-level multi-level converter that is configured to transform an input voltage applied to an input terminal to an output voltage on an output terminal in response to input signals from a controller defining charging cycles and discharging cycles for the multi-level converter (Block 1302), the method includes: adding an extra charging cycle near or at a zero-current crossing point after a discharging cycle (Block 1304); and adding an extra discharging cycle near or at a zero-current crossing point after a charging cycle (Block 1306).

General Benefits and Advantages of Multi-Level Power Converters

Embodiments of the current invention improve the power density and/or power efficiency of incorporating circuits and circuit modules or blocks. As a person of ordinary skill in the art should understand, a system architecture is beneficially impacted utilizing embodiments of the current invention in critical ways, including lower power and/or longer battery life. The current invention therefore specifically encompasses system-level embodiments that are creatively enabled by inclusion in a large system design and application.

More particularly, multi-level power converters provide or enable numerous benefits and advantages, including:

- adaptability to applications in which input and/or output voltages may have a wide dynamic-range (e.g., varying battery input voltage levels, varying output voltages);
- efficiency improvements on the run-time of devices operating on portable electrical energy sources (batteries, generators or fuel cells using liquid or gaseous fuels, solar cells, etc.);
- efficiency improvements where efficiency is important for thermal management, particularly to protect other components (e.g., displays, nearby ICs) from excessive heat;
- enabling design optimizations for power efficiency, power density, and form-factor of the power converter—for example, smaller-size multi-level power converters may allow placing power converters in close proximity to loads, thus increasing efficiency, and/or to lower an overall bill of materials;
- the ability to take advantage of the performance of smaller, low voltage transistors;
- adaptability to applications in which power sources can vary widely, such as batteries, other power converters, generators or fuel cells using liquid or gaseous fuels, solar cells, line voltage (AC), and DC voltage sources (e.g., USB, USB-C, power-over Ethernet, etc.);
- adaptability to applications in which loads may vary widely, such as ICs in general (including microprocessors and memory ICs), electrical motors and actuators, transducers, sensors, and displays (e.g., LCDs and LEDs of all types);
- the ability to be implemented in a number of IC technologies (e.g., MOSFETs, GaN, GaAs, and bulk silicon) and packaging technologies (e.g., flip chips, ball-grid arrays, wafer level scale chip packages, wide-fan out packaging, and embedded packaging).

The advantages and benefits of multi-level power converters enable usage in a wide array of applications. For example, applications of multi-level power converters include portable and mobile computing and/or communication products and components (e.g., notebook computers, ultra-book computers, tablet devices, and cell phones), displays (e.g., LCDs, LEDs), radio-based devices and systems (e.g., cellular systems, WiFi, Bluetooth, Zigbee, Z-Wave, and GPS-based devices), wired network devices and systems, data centers (e.g., for battery-backup systems and/or power conversion for processing systems and/or electronic/optical networking systems), internet-of-things (IOT) devices (e.g., smart switches and lights, safety sensors, and security cameras), household appliances and electronics (e.g., set-top boxes, battery-operated vacuum cleaners, appliances with built-in radio transceivers such as washers, dryers, and refrigerators), AC/DC power converters, electric vehicles of all types (e.g., for drive trains, control systems, and/or infotainment systems), and other devices and systems that utilize portable electricity generating sources and/or require power conversion.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Wide Band Code Division Multiple Access ("W-CDMA"), Global System for Mobile Communications ("GSM"), Long Term Evolution ("LTE"), 5G, and WiFi (e.g., 802.11a, b, g, ac, ax), as well as other radio communication standards and protocols.

Fabrication Technologies & Options

In various embodiments of multi-level power converters, it may be beneficial to use specific types of capacitors, particularly for the fly capacitors. For example, it is generally useful for such capacitors to have low equivalent series resistance (ESR), low DC bias degradation, high capacitance, and small volume. Low ESR is especially important for multi-level power converters that incorporate additional switches and fly capacitors to increase the number of voltage levels. Selection of a particular capacitor should be made after consideration of specifications for power level, efficiency, size, etc. Various types of capacitor technologies may be used, including ceramic (including multi-layer ceramic capacitors), electrolytic capacitors, film capacitors (including power film capacitors), and IC-based capacitors. Capacitor dielectrics may vary as needed for particular applications, and may include dielectrics that are paraelectric, such as silicon dioxide ($SiO_2$), hafnium dioxide ($HFO_2$), or aluminum oxide $Al_2O_3$. In addition, multi-level power converter designs may beneficially utilize intrinsic parasitic capacitances (e.g., intrinsic to the power FETs) in conjunction with or in lieu of designed capacitors to reduce circuit size and/or increase circuit performance. Selection of capacitors for multi-level power converters may also take into account such factors as capacitor component variations, reduced effective capacitance with DC bias, and ceramic capacitor temperature coefficients (minimum and maximum temperature operating limits, and capacitance variation with temperature).

Similarly, in various embodiments of multi-level power converters, it may be beneficial to use specific types of inductors. For example, it is generally useful for the inductors to have low DC equivalent resistance, high inductance, and small volume.

The controller(s) used to control startup and operation of a multi-level power converter may be implemented as a microprocessor, a microcontroller, a digital signal processor (DSP), register-transfer level (RTL) circuitry, and/or combinatorial logic.

While a number of the example embodiments include a 3-level converter, the invention encompasses multi-level converters in general, including 4-level and 5-level converters.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

With respect to the figures referenced in this disclosure, the dimensions for the various elements are not to scale; some dimensions have been greatly exaggerated vertically and/or horizontally for clarity or emphasis. In addition, references to orientations and directions (e.g., "top", "bottom", "above", "below", "lateral", "vertical", "horizontal", etc.) are relative to the example drawings, and not necessarily absolute orientations or directions.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good lincarity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Conclusion

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A multi-level converter including:

an M-level converter cell comprising:

an input terminal;

a set of switches series-coupled between a voltage source and a reference voltage, wherein the set of switches has a switching frequency;

an output terminal coupled to an innermost pair of the set of switches and configured to be coupled to an inductor;

switch control inputs coupled to the set of switches; and at least one fly capacitor coupled in series with certain respective switches and in parallel with switches situated in between the respective switches;

wherein the M-level converter cell is configured to transform an input voltage applied to the input terminal to an output voltage on the output terminal in response to control signals on the switch control inputs;

a controller coupled to the switch control inputs and configured to couple to the inductor, the controller configured to monitor an output of the M-level converter cell and dynamically generate a set of switch control input values to the M-level converter cell in response to such monitoring; and a sub-harmonic signal generator coupled to the controller and configured to selectively inject a sub-harmonic signal into a signal path of the controller, wherein the sub-harmonic signal has a frequency about one-half or less than one-half the switching frequency of the set of switches.

2. The multi-level converter of claim 1, wherein the controller includes a comparison device having an input coupled to the inductor, and wherein the sub-harmonic signal generator is configured to selectively inject the sub-harmonic signal in the signal path between the inductor and the comparison device.

3. The multi-level converter of claim 1, wherein the controller includes a comparison device having a reference voltage input, and wherein the sub-harmonic signal generator is configured to selectively inject the sub-harmonic signal at the reference voltage input.

4. The multi-level converter of claim 1, wherein the controller includes a compensation circuit, and wherein the sub-harmonic signal generator is configured to selectively inject the sub-harmonic signal in the signal path before or after the compensation circuit.

5. A multi-level converter comprising;

an M-level converter cell comprising:

an input terminal;

a set of switches series-coupled between a voltage source and a reference voltage;

an output terminal coupled to an innermost pair of the set of switches and configured to be coupled to an inductor;

switch control inputs coupled to the set of switches; and at least one fly capacitor coupled in series with certain respective switches and in parallel with switches situated in between the respective switches;

wherein the M-level converter cell is configured to transform an input voltage applied to the input terminal to an output voltage on the output terminal in response to control signals on the switch control inputs;

a controller coupled to the switch control inputs and configured to couple to the inductor, the controller configured to monitor an output of the M-level converter cell and dynamically generate a set of switch control input values to the M-level converter cell in response to such monitoring; and a sub-harmonic signal generator coupled to the controller and configured to selectively inject a sub-harmonic signal into a signal path of the controller, wherein the sub-harmonic signal enables charge balancing of the at least one fly capacitor.

6. The multi-level converter of claim 1, wherein the controller includes a pulse-width modulation generator, and wherein the sub-harmonic signal generator is configured to selectively inject the sub-harmonic signal in the signal path after the pulse-width modulation generator.

7. The multi-level converter of claim 1, wherein the sub-harmonic signal generator is configured to inject the sub-harmonic signal when an average current through the inductor is approximately zero amps or when a light load is present on the output terminal.

8. The multi-level converter of claim 1, wherein the sub-harmonic signal creates temporary positive and negative currents sufficient to enable charge balancing of the at least one fly capacitor.

9. The multi-level converter of claim 1, wherein the sub-harmonic signal is an AC waveform having an average voltage of zero.

10. The multi-level converter of claim 1, wherein the switch control inputs include a pulse-width modulated signal, and wherein the sub-harmonic signal generator is configured to inject the sub-harmonic signal by altering a timing of the pulse-width modulated signal.

11. A multi-level converter comprising:

an M-level converter cell comprising:

an input terminal;

a set of switches series-coupled between a voltage source and a reference voltage;

an output terminal coupled to an innermost pair of the set of switches and configured to be coupled to an inductor;

switch control inputs coupled to the set of switches; and at least one fly capacitor coupled in series with certain respective switches and in parallel with switches situated in between the respective switches;

wherein the M-level converter cell is configured to transform an input voltage applied to the input terminal to an output voltage on the output terminal in response to control signals on the switch control inputs;

a controller coupled to the switch control inputs and configured to couple to the inductor, the controller configured to monitor an output of the M-level converter cell and dynamically generate a set of switch control input values to the M-level converter cell in response to such monitoring; and a sub-harmonic signal generator coupled to the controller and configured to selectively inject a sub-harmonic signal into a signal path of the controller, wherein the sub-harmonic signal generator is configured to scale the sub-harmonic signal as a function of the absolute value of an average current through the inductor to obtain a scaled sub-harmonic signal and inject the scaled sub-harmonic signal.

12. The multi-level converter of claim 11, wherein the set of switches has a switching frequency, and the sub-harmonic signal has a frequency about one-half or less than one-half the switching frequency of the set of switches.

13. The multi-level converter of claim 11, wherein the sub-harmonic signal is an AC waveform.

14. The multi-level converter of claim 11, wherein the controller is further configured to add an extra charging cycle near or at a zero-current crossing point after a discharging cycle, and add an extra discharging cycle near or at a zero-current crossing point after a charging cycle.

15. The multi-level converter of claim 11, wherein the controller includes a compensation circuit, and wherein the sub-harmonic signal generator is configured to inject the scaled sub-harmonic signal in the signal path before or after the compensation circuit.

16. The multi-level converter of claim 11, wherein the controller includes a pulse-width modulation generator, and wherein the sub-harmonic signal generator is configured to selectively inject the scaled sub-harmonic signal in the signal path after the pulse-width modulation generator.

17. The multi-level converter of claim 5, wherein the controller includes a compensation circuit, and wherein the sub-harmonic signal generator is configured to selectively inject the sub-harmonic signal in the signal path before or after the compensation circuit.

18. The multi-level converter of claim 5, wherein the sub-harmonic signal generator is configured to inject the sub-harmonic signal when an average current through the inductor is approximately zero amps or when a light load is present on the output terminal.

19. The multi-level converter of claim 5, wherein the sub-harmonic signal generator is configured to inject the sub-harmonic signal by altering a timing of a digital waveform generated by the controller that controls switching of the set of switches.

20. The multi-level converter of claim 5, wherein the sub-harmonic signal is an AC waveform having an average voltage of zero.

* * * * *